United States Patent
Neely et al.

(10) Patent No.: US 10,730,700 B2
(45) Date of Patent: Aug. 4, 2020

(54) SPIRAL CONVEYOR SYSTEM

(71) Applicant: Ashworth Bros., Inc., Fall River, MA (US)

(72) Inventors: Darroll Joseph Neely, Gerrardstown, WV (US); Bryan Hobbs, Medford, MN (US)

(73) Assignee: ASHWORTH BROS., INC., Fall River, MA (US)

( * ) Notice: Subject to any disclaimer, the term of this patent is extended or adjusted under 35 U.S.C. 154(b) by 0 days.

(21) Appl. No.: 16/449,108

(22) Filed: Jun. 21, 2019

(65) Prior Publication Data
US 2019/0308817 A1    Oct. 10, 2019

Related U.S. Application Data

(63) Continuation of application No. 15/854,464, filed on Dec. 26, 2017, now Pat. No. 10,364,101, which is a
(Continued)

(51) Int. Cl.
| | | |
|---|---|---|
| B65G 17/08 | (2006.01) | |
| B65G 21/18 | (2006.01) | |
| B65G 23/06 | (2006.01) | |

(52) U.S. Cl.
CPC ........... *B65G 17/086* (2013.01); *B65G 21/18* (2013.01); *B65G 23/06* (2013.01); *B65G 2207/24* (2013.01)

(58) Field of Classification Search
CPC ...... B65G 17/08; B65G 17/086; B65G 21/18; B65G 2207/24; B65G 23/06
(Continued)

(56) References Cited

U.S. PATENT DOCUMENTS

| | | |
|---|---|---|
| 4,729,470 A | 3/1988 | Bacigalupe et al. |
| 4,741,430 A | 5/1988 | Roinestad |
| | (Continued) | |

FOREIGN PATENT DOCUMENTS

| | | |
|---|---|---|
| EP | 0762983 A1 | 3/1997 |
| JP | 08208015 A | 8/1996 |
| | (Continued) | |

OTHER PUBLICATIONS

International Search Report and Written Opinion dated Oct. 27, 2016 for International Application No. PCT/US2016/043501.
(Continued)

*Primary Examiner* — James R Bidwell
(74) *Attorney, Agent, or Firm* — Plumsea Law Group, LLC

(57) ABSTRACT

A spiral conveyor system may include a drum associated with a motor, wherein the drum extends from a drum bottom to a drum top. In addition, the system may include a conveyor belt traveling helically about the drum from an entrance end of the drum to an exit end of the drum. Further, the system may include a rib associated with the drum, wherein the rib extends radially from a surface of the drum, and at least one drive face positioned on the rib. The conveyor belt may include at least one belt surface configured to engage the at least one drive face. The length of the rib extends along the length of the drum from a first end of the rib to a terminus of the rib proximate the entrance end of the drum. In addition, the drum includes a ring that extends between the terminus of the rib and the entrance end of the drum.

20 Claims, 29 Drawing Sheets

Related U.S. Application Data continuation of application No. 15/216,210, filed on Jul. 21, 2016, now Pat. No. 9,884,723.

(60) Provisional application No. 62/196,582, filed on Jul. 24, 2015.

(58) Field of Classification Search
USPC .......................................................... 198/778
See application file for complete search history.

(56) References Cited

U.S. PATENT DOCUMENTS

| | | | |
|---|---|---|---|
| 4,852,720 A * | 8/1989 | Roinestad | B65G 21/18 198/778 |
| 4,858,750 A | 8/1989 | Cawley | |
| 4,941,566 A | 7/1990 | Irwin | |
| 4,944,162 A * | 7/1990 | Lang | B65G 17/062 198/831 |
| 4,953,365 A * | 9/1990 | Lang | A23L 3/361 198/778 |
| 4,981,208 A | 1/1991 | Jones | |
| 5,069,330 A | 12/1991 | Palmaer et al. | |
| 5,133,449 A | 7/1992 | Spangler | |
| 5,137,141 A | 8/1992 | Irwin | |
| 5,310,045 A | 5/1994 | Palmaer et al. | |
| 5,454,467 A | 10/1995 | Lago | |
| 5,467,865 A | 11/1995 | Irwin | |
| 5,501,319 A | 3/1996 | Larson et al. | |
| 5,772,005 A | 6/1998 | Hansch | |
| 5,992,615 A | 11/1999 | Muchalov | |
| 6,006,898 A | 12/1999 | Odink | |
| 6,062,375 A | 5/2000 | Pupp | |
| 6,382,398 B2 | 5/2002 | Steeber et al. | |
| 6,523,669 B1 | 2/2003 | Steeber et al. | |
| 6,523,677 B1 | 2/2003 | DeGennaro et al. | |
| 6,550,610 B2 | 4/2003 | Rettore | |
| 6,591,963 B2 | 7/2003 | Wipf | |
| 6,607,073 B2 | 8/2003 | Buchi et al. | |
| 6,796,418 B1 | 9/2004 | Harrison et al. | |
| 7,258,226 B2 | 8/2007 | Nelson et al. | |
| 8,181,771 B2 | 5/2012 | Talsma | |
| 8,302,764 B2 | 11/2012 | Johnson | |
| 8,302,765 B2 | 11/2012 | Lago | |
| 8,622,201 B2 | 1/2014 | Seger et al. | |
| 8,672,121 B2 | 3/2014 | Shah et al. | |
| 9,884,723 B2 * | 2/2018 | Neely | B65G 17/086 |
| 10,155,627 B2 * | 12/2018 | Chang | B65G 21/18 |
| 10,364,101 B2 * | 7/2019 | Neely | B65G 17/086 |
| 2011/0056606 A1 | 3/2011 | Johnson | |
| 2011/0056806 A1 * | 3/2011 | Johnson | B65G 21/18 198/778 |
| 2012/0006654 A1 | 1/2012 | Talsma | |
| 2012/0043182 A1 | 2/2012 | Balk et al. | |
| 2013/0118867 A1 | 5/2013 | Salsone et al. | |
| 2015/0047952 A1 | 2/2015 | Talsma et al. | |
| 2015/0090560 A1 * | 4/2015 | Talsma | B65G 21/18 198/778 |

FOREIGN PATENT DOCUMENTS

| | | |
|---|---|---|
| JP | 2013503801 A | 2/2013 |
| JP | 2015-514047 A | 5/2015 |
| WO | 2011028918 A1 | 3/2011 |
| WO | 2013142136 A1 | 9/2013 |

OTHER PUBLICATIONS

Office Action dated Jun. 29, 2018 in Australian Patent Application No. 2016297781.

Office Action dated Jul. 9, 2019 in Japanese Patent Application No. 2018-503661.

Office Action dated Jun. 19, 2019 in Korean Patent Application No. 10-2018-7005453.

Notice of Allowance dated Oct. 22, 2019 in Korean Patent Application No. 10-2018-7005453.

Office Action dated Jun. 7, 2018 in New Zealand Patent Application No. 739539.

Extended European Search Report dated Mar. 14, 2019 in European Application No. 16831113.2.

* cited by examiner

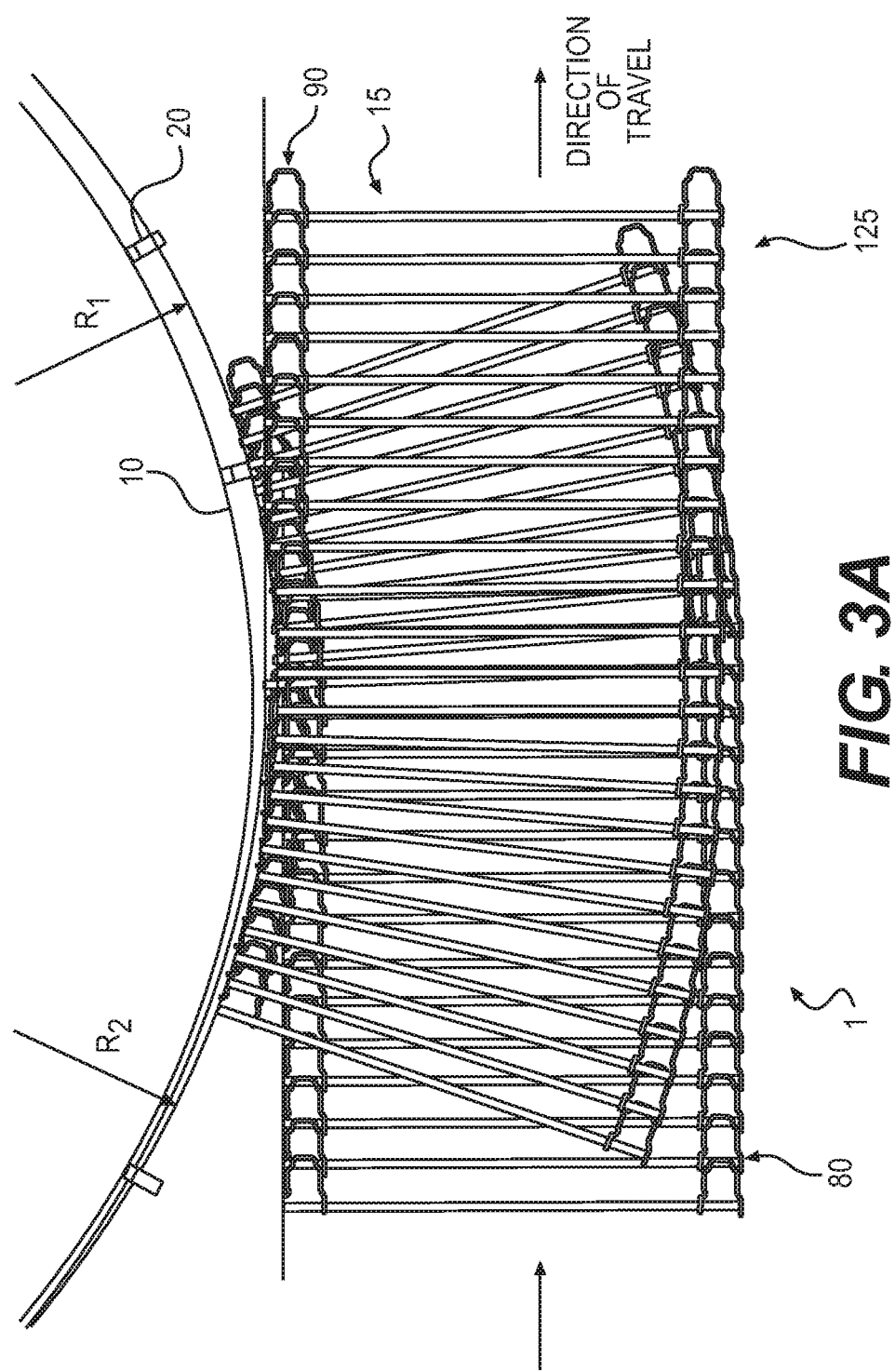

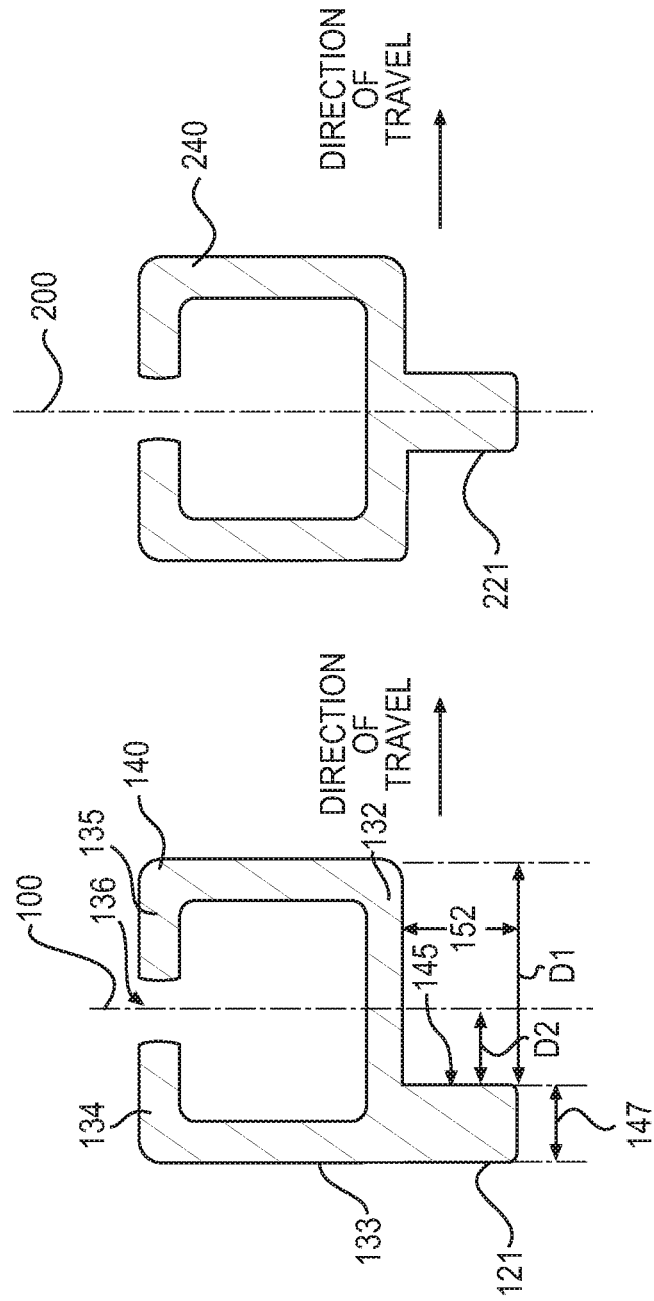

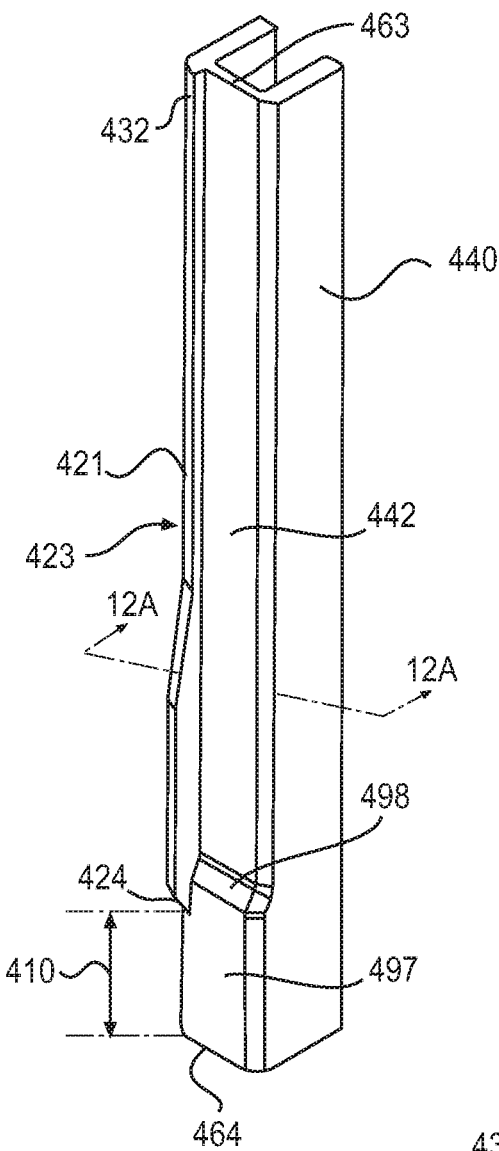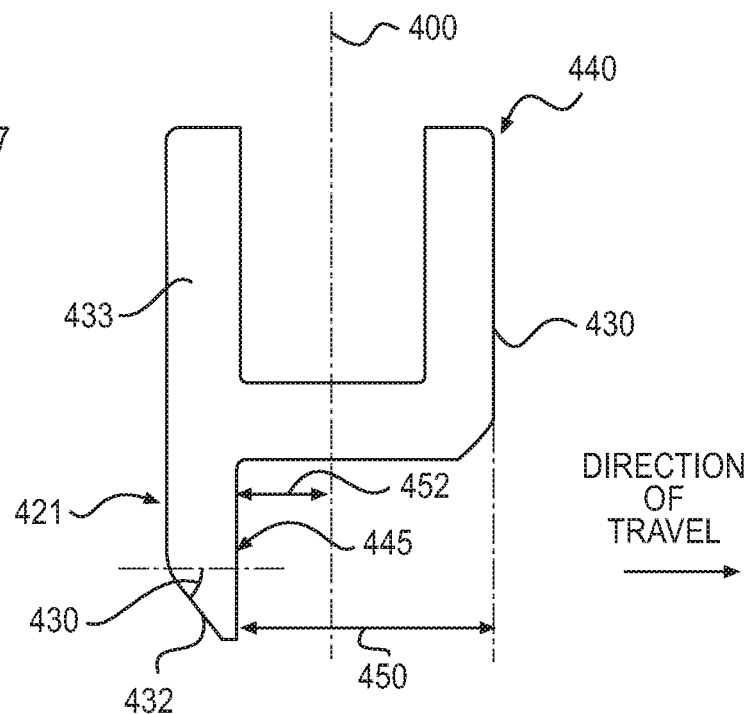
FIG. 12
FIG. 12A

SPIRAL CONVEYOR SYSTEM

CROSS-REFERENCE TO RELATED APPLICATION

This application is a continuation of Neely et al., U.S. Patent Appl. Publ. No. 2018/0290833, published Oct. 11, 2018, and entitled "Spiral Conveyor System," which is a continuation of Neely et al., U.S. Patent Appl. Publ. No. 2017/0022012, published Jan. 26, 2017, and entitled "Spiral Conveyor System," which claims priority under 35 U.S.C. § 119(e) to U.S. Provisional Patent Application No. 62/196,582, entitled "Spiral Conveyor System," and filed on Jul. 24, 2015, which applications are hereby incorporated by reference.

BACKGROUND OF THE INVENTION

The present invention relates to positive drive systems for spiral conveyor belts. In particular, the invention relates to a drum with ribs, where the drive face for engaging the conveyor belt is on the rib and where the rib height above the surface of the drum varies.

BRIEF DESCRIPTION OF THE DRAWINGS

The embodiments can be better understood with reference to the following drawings and description. The components in the figures are not necessarily to scale though the scale shown may be considered one embodiment, emphasis instead being placed upon illustrating the principles of the embodiments. Moreover, in the figures, like reference numerals designate corresponding parts throughout the different views.

FIG. 3A is an enlarged plan view of a portion of a spiral conveyor system showing a portion of a drum and the engagement of different tiers of a conveyor belt with the drum;

FIG. 9A is a cross-sectional view of the cage bar cap of FIG. 9, taken along line 9A-9A;

FIG. 10A is a cross-sectional view of the cage bar cap of FIG. 10, taken along line 10A-10A;

FIG. 12 is a perspective view of a cage bar cap having an offset and chamfered protruding rib;

FIG. 12A is a cross-sectional view of the cage bar cap of FIG. 12, taken along like 12A-12A;

DETAILED DESCRIPTION

For clarity, the detailed descriptions herein describe certain exemplary embodiments, but the disclosure in this application may be applied to any positive drive spiral conveyor system including any suitable combination of features described herein and recited in the claims. In particular, although the following detailed description describes certain exemplary embodiments, it should be understood that other embodiments may be used for positive drive spiral conveyor belts with contoured drive elements.

The spiral conveyor system discussed below is generally a positive drive system, where a drive element comes into direct contact with the conveyor belt to propel the conveyor belt in a travel direction. In the systems discussed below, a central rotating drum includes drive elements that include a drive face for engaging with the conveyor belt. The drive face on the drive element may be adjacent a contoured surface of the drive element, such as a rib that protrudes from the drum or a surface of the drive element. The rib may provide improved geometry for the drive face and also may smooth the travel of the conveyor belt up or down the spiral, particularly when the rib itself has varying height above the drum surface. The conveyor belt may also include a provision to enhance the engagement with the rib, such as a protrusion or a tab with a flat surface for better contact with the drive face.

Figure 1:
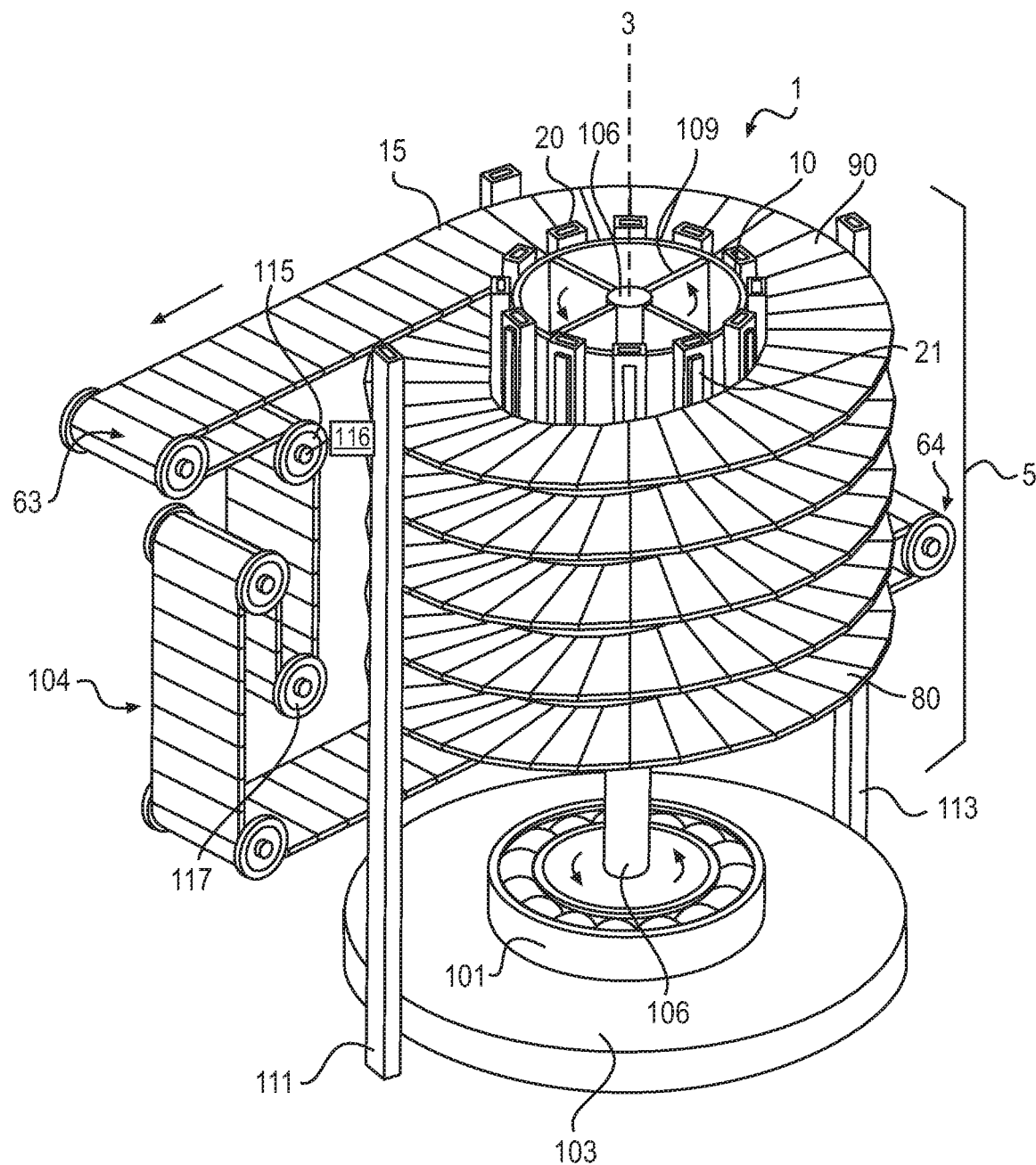
FIG. 1 shows a schematic diagram of a spiral conveyor system.

FIG. 1 shows an embodiment of a spiral conveyor system 1 that may utilize at least one contoured drive element drive system. Spiral conveyor systems such as spiral conveyor system 1 are well known in the art. Spiral conveyor system 1 may include a conveyor belt 15 that is configured to travel a spiral column 5 around a driving drum 10. In some embodiments, driving drum 10 may include one or more drive elements 20 that engage with conveyor belt 15 for a positive drive system, where the frictional and/or geometric engagement of the drive elements 20 with conveyor belt 15 impart forward motion to conveyor belt 15. In some embodiments, driving drum 10 and the edge of conveyor belt 15 may include provisions that engage with each other to transfer driving force from the turning drum to the conveyor belt.

Drum 10 may be configured to rotate at various RPM (revolutions per minute), but may be configured to turn at low RPM. The precise speed may depend upon factors such as the height of spiral column 5, the length of belt 15, and the intended use of the system, such as to establish a particular cooking, baking, or freezing time. In some embodiments, drum 10 may turn at 15 RPM or less. In some embodiments, drum 10 may turn at 10 RPM or less. In some embodiments, drum 10 may turn at 4 RPM or less. In some embodiments, drum 10 may turn at a rate between 0.1 RPM and 10 RPM, inclusive.

Figure 3:
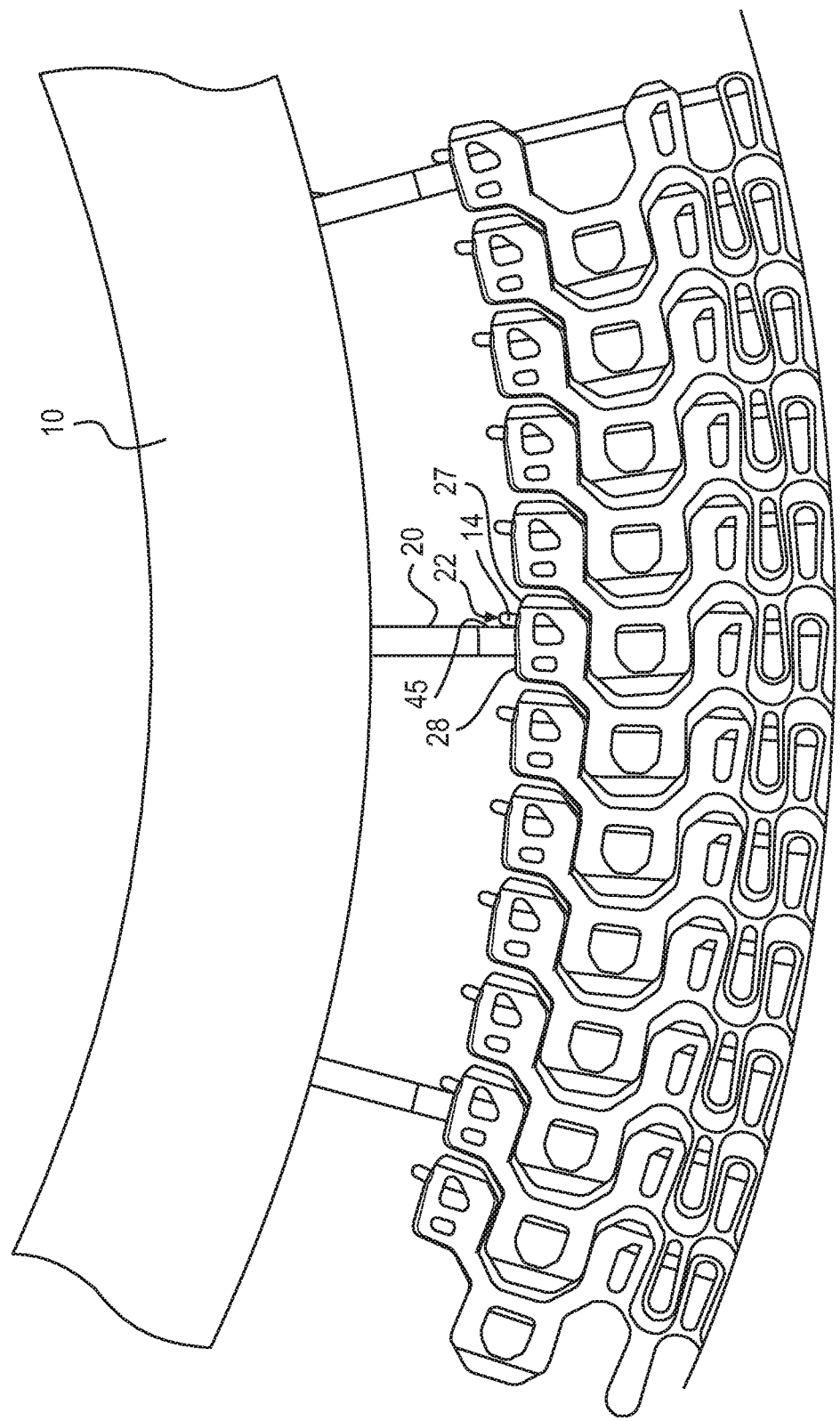
FIG. 3 is an enlarged partial plan view of a portion of a spiral conveyor system showing engagement of a conveyor belt with drive elements.
Figure 4:
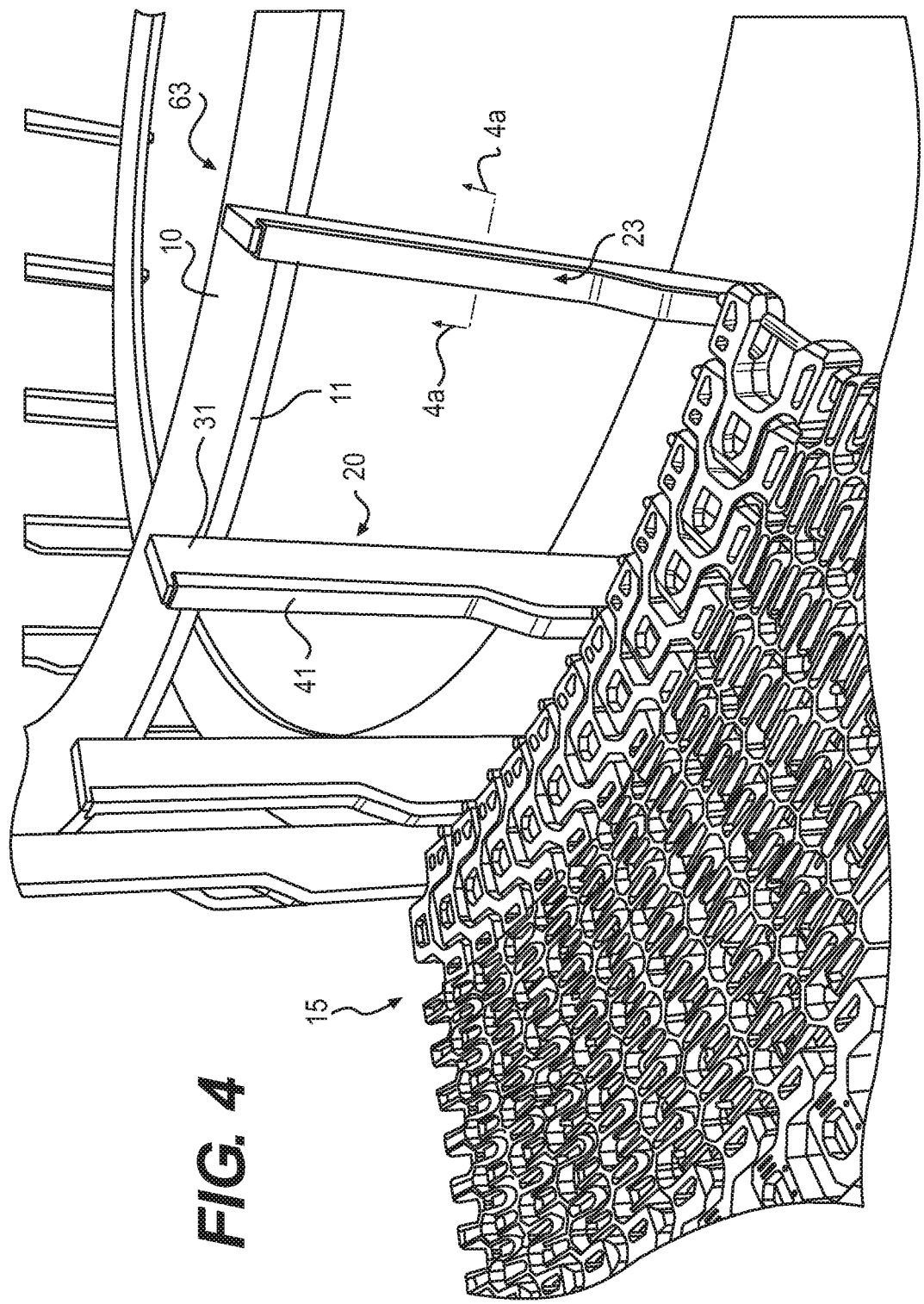
FIG. 4 is an enlarged perspective view of a top portion of a spiral conveyor system showing engagement of a conveyor belt with drive elements of the system.
Figure 4A:
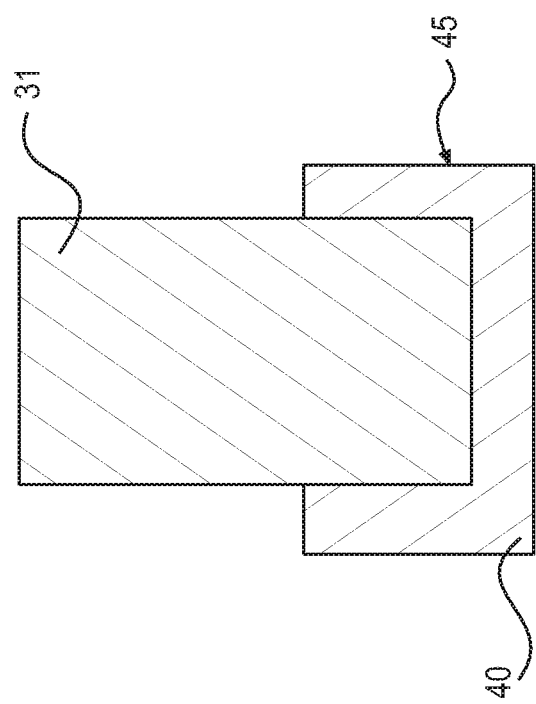
FIG. 4A is a cross-sectional view of a drive element of the system of FIG. 4, taken along line 4A-4A.

Drum 10 may be rotated using any method known in the art, such as with a motor (not shown) positioned proximate a base 103 of spiral conveyor system 1. The motor may transfer the power it generates to drum 10 using any mechanism known in the art. In some embodiments, such as the embodiment shown in FIG. 1, known systems, such as chains and gear boxes to control the transfer of power from the motor to shaft 106, may be provided. Shaft 106 may be any type of drive shaft known in art, such as an elongated metal pole that extends from base 103 to the top of spiral column 5 along drum central axis 3. One or more struts such as strut 109 may attach shaft 106 to drum 10 to transfer the rotational force of shaft 106 to drum 10. Drum 10 may be generally cylindrical in shape and may, in some embodiments, include a cylindrical surface 11 as shown in FIG. 6. The cylindrical surface may be a continuous cylindrical drum surface formed of sheet metal, or may have a discontinuous surface formed of individual vertical drive elements extending between and connecting circular support bands arranged about the center axis of the drum, or may be a combination of sheet metal and vertical bars as shown in FIG. 1. Other construction is contemplated to provide a suitable cylindrical surface for guiding an inside edge of belt 15 through spiral column 5. Drive elements 20 may comprise a contoured rib attached to the sheet metal surface of the drum, such as in the embodiments shown in FIGS. 2-7, or to a cage bar, as shown in FIGS. 8-26 where the rib extends from a surface of a cage bar cap, or may comprise a combination of a cage bar and a contoured rib. Drive elements 20 may also comprise a cap or covering, such as to provide the contoured surface and/or for improved wear properties, such as shown in FIGS. 4 and 4A.

A bottom bearing 101 may be provided in, on, or associated with a motor, gearbox, and/or a conveyor frame. As is known in the art, a bottom bearing 101 is provided to reduce rotational friction between the motor and/or base 103 and shaft 106 while supporting radial and axial loads. Bearings and their functionality are generally well known and understood in the art.

Figure 2:
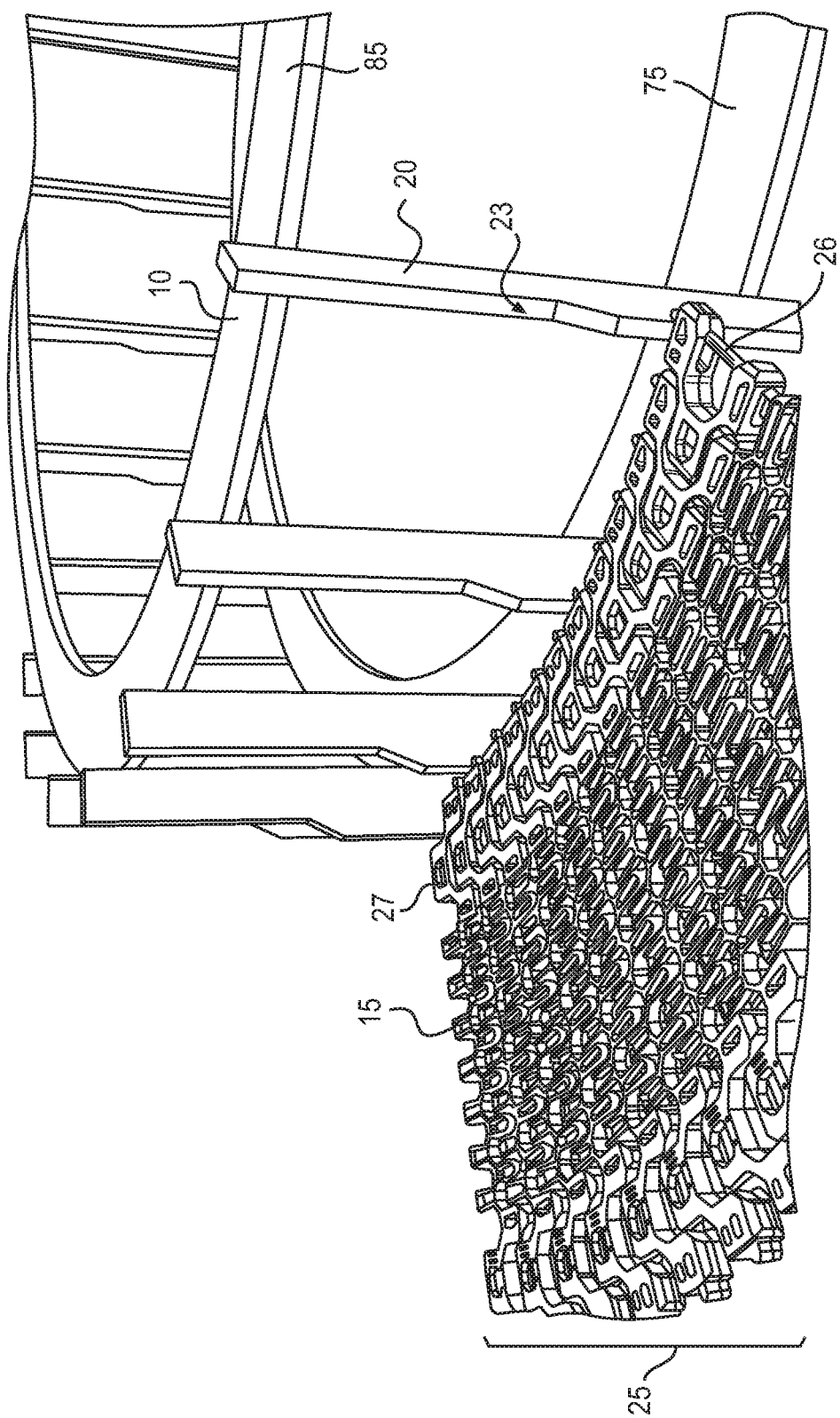
FIG. 2 is an enlarged partial perspective view of a portion of a spiral conveyor system showing engagement of a conveyor belt with drive elements of the system.

Conveyor belt 15 may be modular and include links 25 and connecting rods 26 as shown in FIG. 2. Conveyor belt 15 may be any type of endless belt known in the art. Conveyor belt 15 may be made from metal, plastic, composites, ceramics, combinations of these materials, or any other type of conveyor belt material known in the art. The particular material may be selected based on factors such as temperature exposure (baking, freezing, room temperature conveying), required tension, length of the belt, ability to clean and/or disinfect the belt, etc. In some embodiments, such as the embodiment shown in FIG. 1, belt 15 may be an upgoing belt, where belt 15 travels from a bottom 64 of spiral column 5 to a top 63 of spiral column 5. In other embodiments, the direction of travel may be downgoing, where belt 15 travels from top 63 to bottom 64. Belt paths at top 63 and bottom 64 may be aligned as shown or arranged at an angle with respect to each other about a central axis 3 of drum 10.

In use, a conveyor belt 15 enters at one end of drum 10, typically bottom 64. Conveyor belt 15 may be fed into the system 1 off of two rollers or sprockets positioned on an axle. Conveyor belt 15 travels through stacked helical tiers around the center drum 10. Conveyor belt 15 then exits at the opposite end of drum 10, typically near top 63. Conveyor belt 15 may be an endless belt 15, in which case conveyor belt 15 is fed back to the axle/sprocket at the other end of drum 10 (e.g., in one embodiment, belt 15 travels back to bottom 64 of drum 10 after exiting at top 63 of drum 10.) In any embodiment, however, the system may be upgoing (traveling from bottom to top) or downgoing (traveling from top to bottom). The gearing and optional weighting of belt 15 at the entrance and/or exit points of spiral 5 may be configured to assist in controlling tension in belt 15 as belt 15 moves through the system 1. For example, system 1 may include a take-up sprocket 115 configured to pull belt 15 out of spiral column 5. Take-up sprocket 115 may be located at or after the first terminal roller. Take-up sprocket 115 may be independently driven, such as with a motor 116. In some embodiments, the motor may be a constant torque motor so that the tension in belt 15 may be controlled within a desired range. In some embodiments, a weighted take-up roller 117 may be provided to assist in maintaining the belt tension along return path 104 and to remove slack belt from the system. Proper tension in belt 15 may inhibit operational issues such as slippage of belt 15 with respect to drum 10, belt flip-up, or difficulty feeding belt 15 into or out of the helical stack.

In some embodiments, the first tier 80 of belt 15 at the entrance end (e.g., bottom 64) has a first larger radius and the last tier of belt 15 at the exit end has a second smaller radius. For example, FIG. 3A shows two different tiers, first tier 80 and second tier 90, of belt 15 made of links 125 and elongated rods 126 that connect the links together. Drum 10 may have a first radius R1 supporting first tier 80 and a second smaller radius R2 supporting second tier 90. First radius R1 may be at a lower position on drum 10 than second radius R2. Belt 15 may be held at either radius by engagement of the circumferential support surfaces of belt 15 with circumferential support surfaces of the drive elements 20, which are discussed in more detail below with respect to other embodiments.

In some embodiments, belt 15 may have circumferential support surfaces and driving surfaces on the inner edge of belt 15 configured to engage the drive elements. An example of such a belt configuration is shown in FIG. 3 which shows a partial plan view of the embodiment of the spiral system shown in FIG. 2. In FIG. 3, the engagement between the edge link 27 and drive element is clearly shown. Belt 15 may include a protrusion 14 configured to engage the driving face 45 of driving element 20 at engagement point 22. In some embodiments, protrusion 14 may be a tab or flange extending from an outside surface of edge link 27. In some embodiments, protrusion 14 may be a portion of a connecting rod 26. In the embodiment of FIG. 2, driving element 20 comprises a contoured rib that extends between lower support ring 75 and upper support ring 85 and is configured to fit between adjacent belt protrusions 14. Drive element 20 has a contoured circumferential support surface 23 and a driving face 45 shown in FIG. 3. Due to the direction of travel, the relative position of protrusion 14 and drive element 20 is such that drive element 20 is trapped behind protrusion 14. Therefore, driving element 20 can push against protrusion 14. Belt 15 may also include circumferential support surfaces on edge links 27 configured to engage a circumferential support surface of a driving element to hold the belt at a predetermined radius.

FIGS. 4 and 4A show a portion of a top of drum 10, where each drive element 20 includes a contoured rib 31 and a rib cover or wear cap 41. In the embodiment shown in FIG. 4, wear cap 41 follows the contoured surface of contoured rib 31 and provides drive face 45 shown in FIG. 3 for engaging conveyor belt 15. In the embodiment shown in FIG. 4, cage bar caps 40 are separate and distinct from contoured ribs 31 and are attached to contoured ribs 31. In some embodiments, the attachment may be fixed and permanent, such as by welding, using adhesives, or with rivets. In other embodiments, the attachment may be removable, such as when press-fitted, interference-fitted, with screws, clips, or the like.

FIG. 4A, a cross-section of a driving element from FIG. 4, shows that contoured rib 31 is distinct from wear cap 41. As shown in FIG. 4A, contoured rib 31 is solid in cross-section and wear cap 41 is a three-sided, U-shaped portion of material that is sized and shaped to fit over and partially surround contoured rib 31 so that wear cap 41 faces outward towards belt 15. In other embodiments, contoured rib 31 may be hollow or have any other cross-sectional shape. As shown in FIG. 4, wear cap 41 is oriented on contoured rib 31 so that wear cap 41 faces conveyor belt 15. In this embodiment, wear cap 41 may be attached to contoured rib 31 using any of the methods discussed above. In this embodiment, wear cap 41 may act as a lower coefficient of friction cover of contoured rib 31 and simply follow the contours of contoured rib 31. Although shown as generally parallel to the belt edge, contoured surface 23 may be angled or have a chamfered edge, and wear cap 41 may be correspondingly angled with a chamfered edge to improve engagement with the belt.

Contoured rib 31 may be made of any material, such as metal, plastic, or composite. Wear cap 41 may be made of the same material as contoured rib 31 or a different material. For example, in a typical embodiment, contoured rib 31 may be made from a metal while wear cap 41 may be made from a plastic material. In other embodiments, contoured rib 31 may be made from a plastic material and wear cap 41 may be made from the same plastic material. In other embodiments, contoured rib 31 may be made from a plastic material while wear cap 41 may be made from a different plastic material. Any combination of materials may be appropriate depending upon the intended use. For example, both contoured rib 31 and wear cap 41 may be made from the same metal or metals having similar thermal expansion properties for baking embodiments. Similarly, both contoured rib 31 and wear cap 41 may be made from the same plastic material or plastic materials having similar low temperature properties for freezing embodiments. Further, wear cap 41 may be made from a material with a lower coefficient of friction and/or more durable wear properties than contoured rib 31 for long-term engagement with conveyor belt 15. In some embodiments, wear cap 41 may be a sacrificial wear component.

Figure 5:
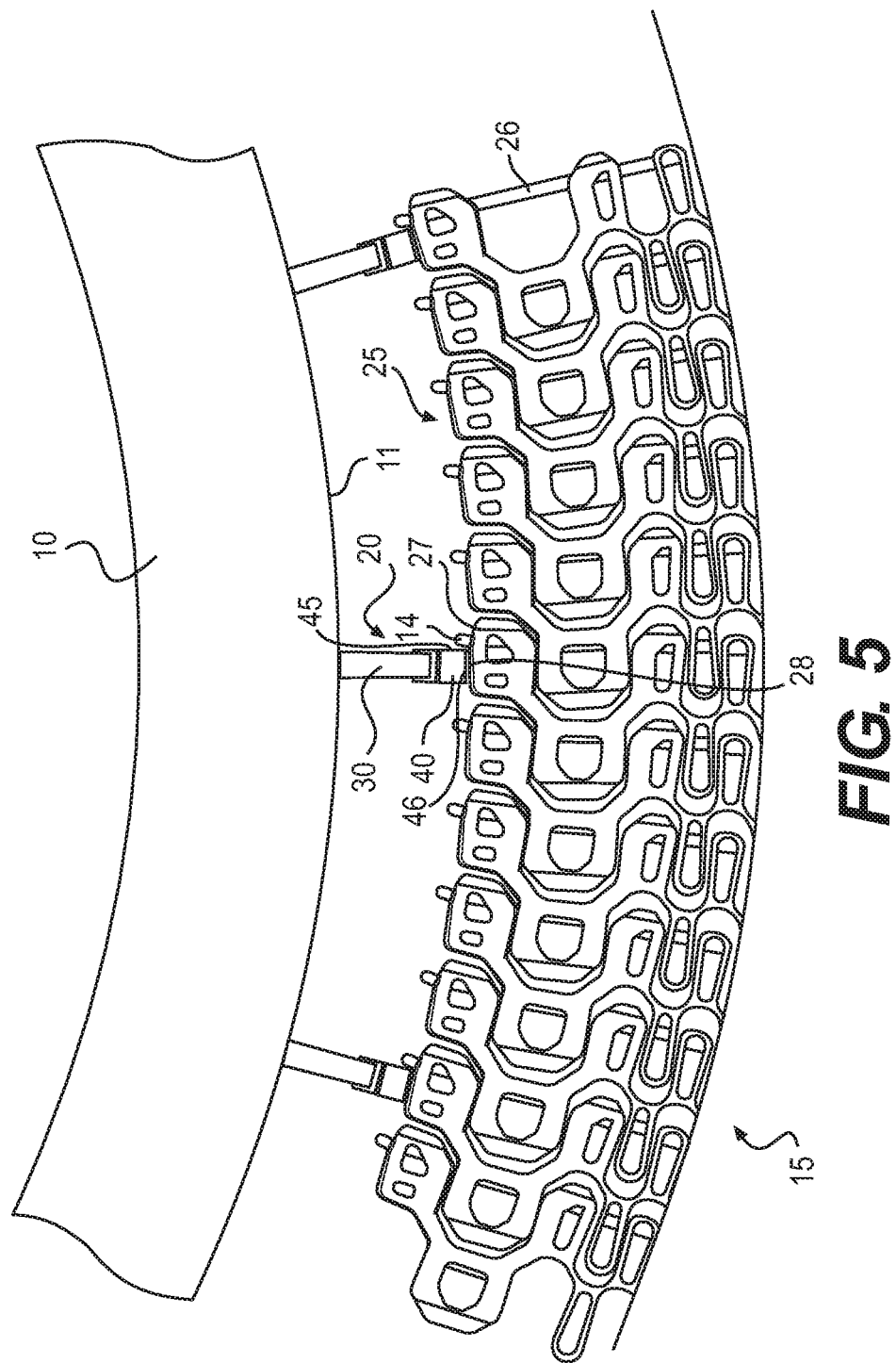
FIG. 5 is an enlarged plan view of a portion of a spiral conveyor system showing engagement of a conveyor belt with drive elements that include caps.
Figure 6:
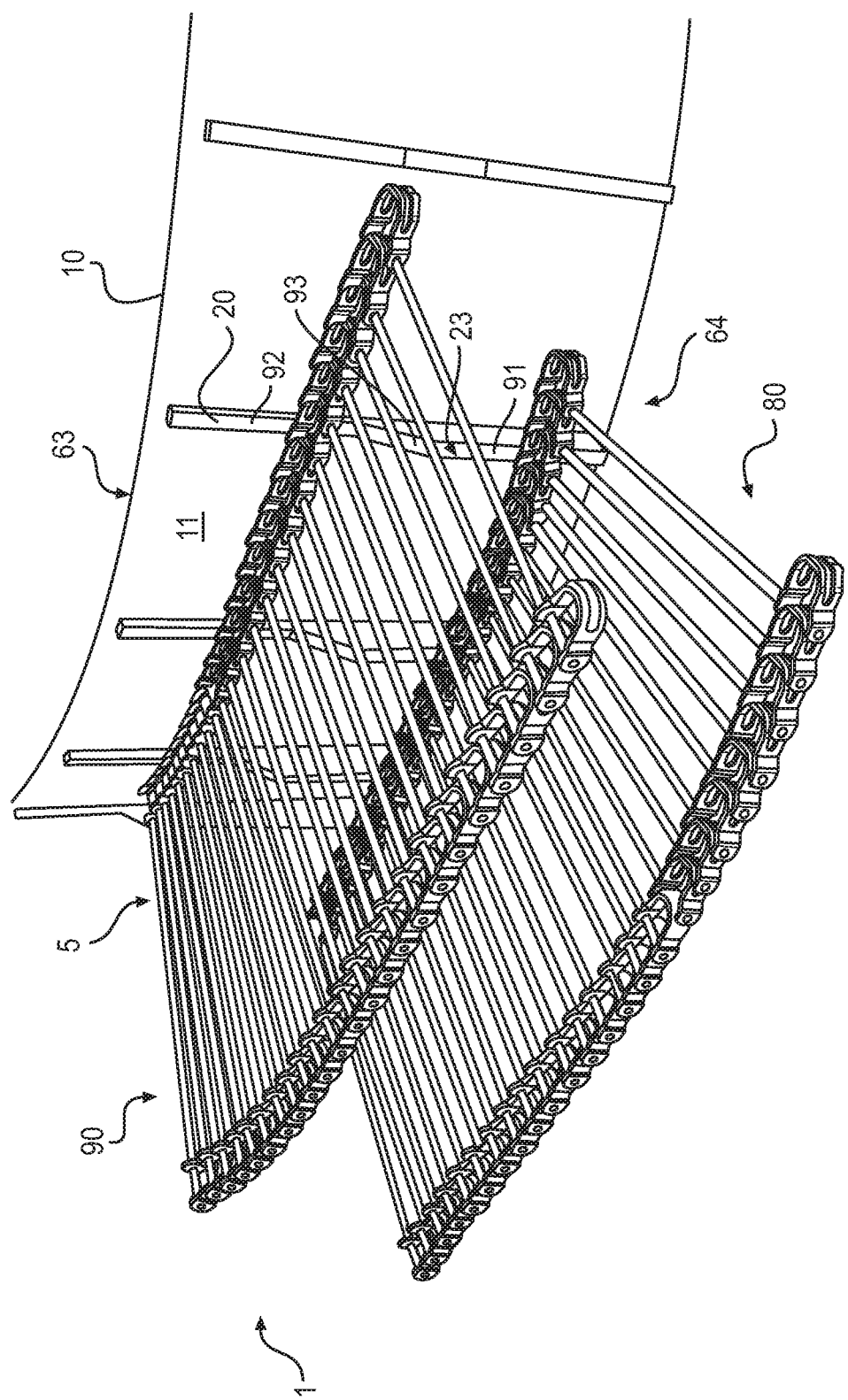
FIG. 6 is a partial perspective view of a portion of a spiral conveyor system showing two belt tiers and engagement of the conveyor belt with drive elements.

FIG. 5 shows a partial plan view of the embodiment of the spiral system shown in FIG. 4. In FIG. 5, the engagement between the edge link 27 and wear cap 41 is more clearly shown. Wear cap 41 follows a contoured surface of contoured rib 31, creating a circumferential support surface 46 on wear cap 41 for contacting corresponding outer edge surface 28 of edge link 27 belt 15. Wear cap 41 also covers a driving face of contoured rib 31, creating a driving face 45 on wear cap 41 for engaging protrusion 14 of belt 15. Due to the direction of travel, the relative position of protrusion 14 and wear cap 41 is such that wear cap 41 is trapped behind protrusion 14. Wear cap 41, and, therefore, driving element 20 can push against protrusion 14.

Contoured surface 23 shown in FIG. 4 may have any combination of curved, tapered, and flat portions. In some embodiments, contoured surface 23 varies the height of the drive face above drum surface 11. This height variation allows for improved tension control as belt 15 travels along spiral tower 5. In some embodiments, contoured surface 23 is arranged so that as belt 15 follows the contour, the height either remains constant or decreases—the height does not increase in the direction of belt movement. This constant or decreasing height of contoured surface 23 above drum surface 11 serves to prevent increases in belt tension that would otherwise result from increasing the radius of a tier of belting.

FIG. 6 shows two tiers of an edge driven system with contoured drive elements showing the relative position of the two tiers at different heights on spiral tower 5. In this embodiment, drive element 20 is a contoured rib attached to drum 10, where drive element 20 includes a contoured surface 23 that has three sections of varying height above drum surface 11: a lowest section 91 that extends the furthest away from drum surface 11, an upper section 92 whose surface is closer to drum surface 11 than a surface of lowest section 91, and a tapered section 93 that connects lower section 91 and upper section 92. In this embodiment, lower section 91 and upper section 92 are both flat, with unvarying height above drum surface 11 within the discrete section. In other embodiments, any section may include subsections with varying height and/or continuous tapers like tapered section 93.

Figure 7:
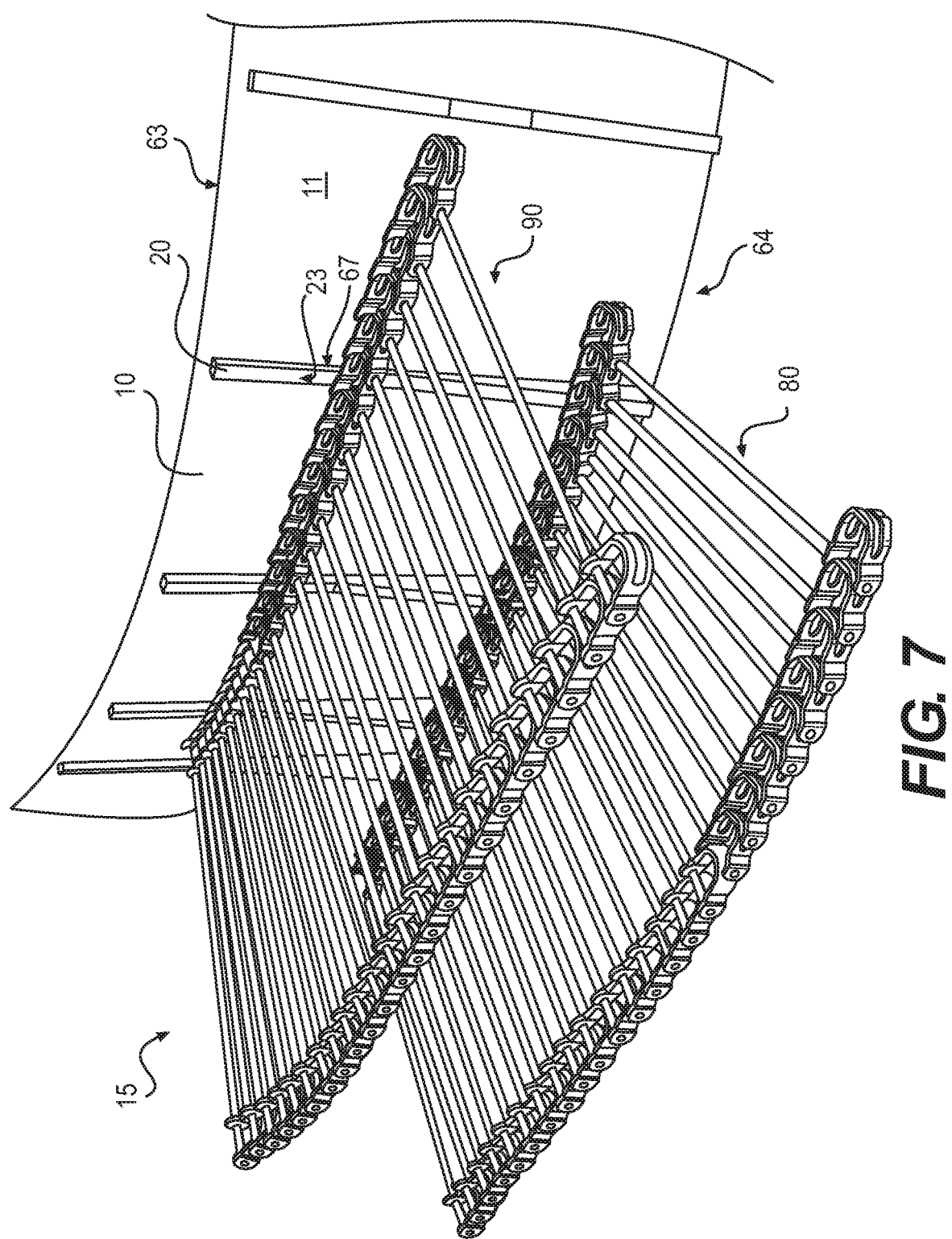
FIG. 7 is a partial perspective view of a portion of a spiral conveyor system showing two belt tiers and engagement of the conveyor belt with drive elements.

Contoured surface 23 positions belt 15 at different radii depending upon the position of belt 15 on drum 10. First tier 80 is positioned proximate a bottom 64 of drum 10 on lower section 91 of driving element 20. Second tier 90 is positioned proximate top 63 of drum 10 on upper section 92 of driving element 20. Lower section 91 is the highest part of contoured surface 23 while upper section 92 is closer to drum surface 11 than lower section 91. Therefore, first tier 80 is positioned further away from drum surface 11 than second tier 90. The loop of first tier 80 around drum 10 has a greater radius than that of second tier 90. As a weighted roller often assists in the take-up of belt 15 when exiting spiral 5 as shown by weighted roller 117 in FIG. 1, the smaller radius proximate the spiral exit may help to produce a constant tension in belt 15 in all tiers of spiral 5. FIG. 7 shows a similar arrangement of first tier 80 and second tier 90 but on drive elements 20 that have a constant taper in the lower portion that is furthest away from drum surface 11 at bottom 64 and a constant height in the upper portion closest to drum surface 11 at exit point 67.

The embodiments shown above with respect to FIGS. 2-7 show embodiments that may be particularly suitable for high temperature uses, such as cooking and baking. Oven and/or cooker drums are generally constructed as cages, such as is best shown in FIG. 4, or as continuous sheet metal cylinders, such as is best shown in FIGS. 6 and 7. While rapid wear due to contact between the drum and belt is typically tolerated, some expensive high temperature plastics such as PEEK (poly ether ether ketone) may be used to increase the life of the parts. However, the high costs and more rigid mechanical properties may make PEEK and similar materials undesirable. Therefore, while any material may be appropriate for the drive components, all drive components in the embodiments shown in FIGS. 2-7 may be made from metals to be cost effective and relatively easy to machine/manufacture. However, in an embodiment such as the embodiment shown in FIG. 4, a relatively small wear cap 41 is provided. Wear cap 41 has a much smaller cross-sectional area than a standard cage bar cap, such as the cage bar cap 140 shown in FIGS. 9 and 9A below. As such, a small wear cap like wear cap 41 may be cost-effective to produce in PEEK or a similar high temperature material.

Figure 8:
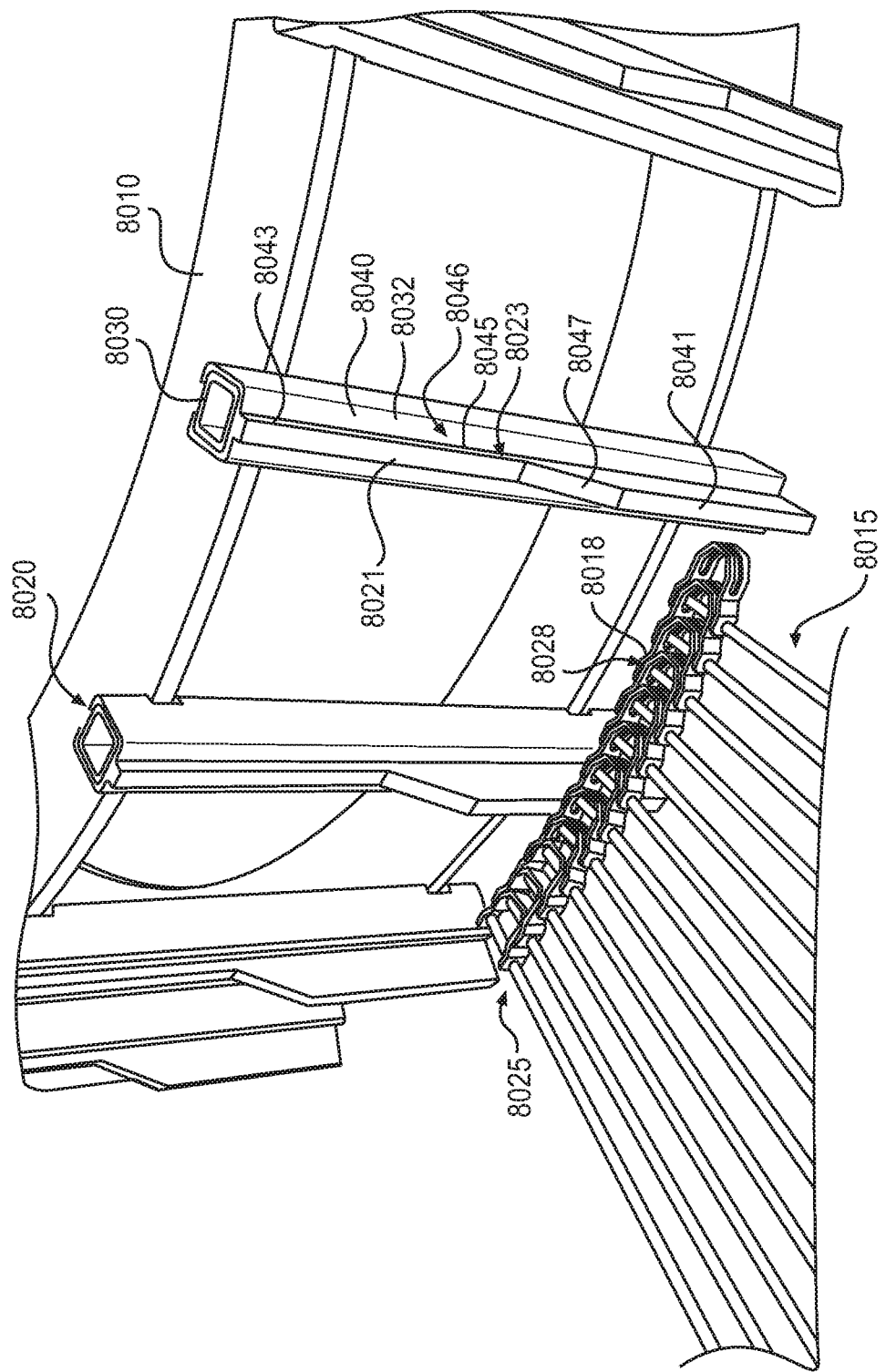
FIG. 8 is an enlarged perspective view of a spiral conveyor system showing drive elements with cage bar caps each having a protruding rib having a drive face to engage with the conveyor belt.

In contrast, the embodiments shown below with respect to FIGS. 8-26 may be manufactured for lower temperature systems, such as for any use at less than about 100 degrees C., for example room temperature conveying or freezing operations. In such embodiments, a wider variety of materials may be used for the drive surfaces. In many embodiments, a drum may be constructed in a typical cage configuration, with upper and lower rings connected by vertical cage bars, such as shown in FIG. 8. In cage bar embodiments, the cage bars may be covered with cage bar caps made from inexpensive materials for use as sacrificial wear components. A typical material is UHMW (ultra high molecular weight polyethylene). Such inexpensive wear materials may not be appropriate for higher temperature applications due to glass transition and melt temperatures. However, for lower temperature systems, UHMW and similar materials are easily extruded, even when including a protruding and, in some embodiments, contoured rib. Machining such a rib is also readily achieved. These lower cost manufacturing abilities make such fabrications even lower cost than forming similar structures from metals such as steel. Further, because UHMW and similar materials may be somewhat soft, cage bar caps made from UHMW may be readily manipulated to snap onto a cage bar. Finally, such UHMW cage bar caps may be used to retrofit existing systems with ribbed cage bar caps by simply replacing an existing ribless cage bar cap with a ribbed cage bar cap, particularly when installing the ribbed cage bar in a freezer or other hard-to-access system where the cage bar may be bent to be maneuvered into the proper position.

In some embodiments, contoured surface 23 may also include additional geometry to better engage belt 15. FIGS. 8-26 show various embodiments of drive elements 20 that include a rib that protrudes from the surface of drive elements 20 toward belt 15. These ribs include the height varying contoured surface 23 and also provide a drive face configured to contact a portion of belt 15, such as a tab on an edge link as discussed above.

FIG. 8 shows a partial perspective view of a drum 8010 that includes drive elements 8020. Rib 8021 is a protrusion that extends away from a base surface 8032 of cage bar cap 8040 towards belt 8015 and establishes a contoured surface 8023. Similar to contoured surface 23 discussed above with respect to FIG. 6, contour surface 8023 includes a flat lower section 8041 at a first height above base surface 8032, an upper section 8043 at a second, lower height above base surface 8032, and a tapered section 8047 that continuously joins lower section 8041 to upper section 8043. A leading edge 8046 of rib 8021 may include a drive face 8045 that engages with belt 8015. In some embodiments, belt 8015 may engage the drive face 8045 with the end surface 8028 of a link leg 8018.

Figure 9:
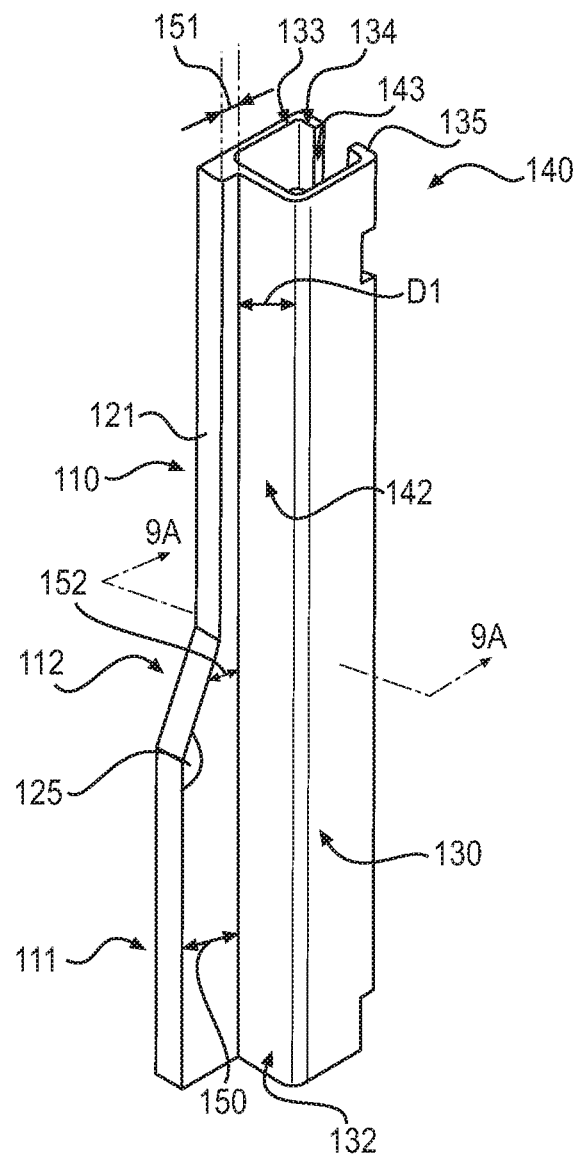
FIG. 9 is a perspective view of a cage bar cap having a protruding rib.

FIGS. 9 and 9A show another embodiment of a cage bar cap 140 with an offset rib 121 that may be used in a spiral system such as the system shown in FIG. 8. In this embodiment, cage bar cap 140 is a structure configured to fit onto cage bar 8030 and includes a body with four walls that define an interior cavity 143: a first wall 130, a second or front wall 132, third wall 133, and an open, discontinuous fourth wall that includes a fourth wall first portion 134 and a fourth wall second portion 135. Cavity 143 is configured to receive a cage bar (not shown), so that first wall 130, second wall 132, third wall 133, and fourth wall portions 134, 135 cover the cage bar. While first wall 130, second wall 132, third wall 133 may fully cover a corresponding cage bar wall, discontinuous fourth wall portions 134, 135 will only cover a portion of a corresponding cage bar wall, as a gap 136 between fourth wall first portion 134 and fourth wall second portion 135 allows a cage bar to be inserted into cavity 143 or allows for some give in cage bar cap 140 to permit cage bar cap 140 to slide onto a cage bar. Cage bar cap 140 may be made of any metal or synthetic material.

Cage bar cap 140 may be oriented on a cage bar so that front wall 132 is configured to face a conveyor belt (not shown) when cage bar cap 140 is installed in a spiral system.

Cage bar cap 140 includes a rib that extends away from the body. In this embodiment, offset rib 121 protrudes away from a base surface 142 of front wall 132 to a rib height, and a length of offset rib 121 is coextensive with a top-to-bottom length of cage bar cap 140. In this embodiment, rib height varies along the length of offset rib 121. Similar to embodiments discussed above, offset rib 121 includes three continuous portions: an upper section 110, a lower section 111, and a tapered section that connects upper section 110 and lower section 111. Upper section 110 extends a first height 151 above cage bar cap surface 142, where first height 151 is constant; tapered section 112 extends a second height 152 above cage bar cap surface 142, where second height varies along the length of tapered section 112; and lower section 111 extends a third height 150 above cage bar cap surface 142. In this embodiment for an upgoing belt, third height 150 is greater than first height 151, while second height 152 tapers from third height 150 to first height 151. In other embodiments where the belt is downgoing, offset rib 121 may be inverted.

Third height 150 may be based on several factors, including the size of the drum, the tension of the incoming belt, and the elasticity of the belt. Third height 150 may be chosen to create an increase in the circumference of a first tier of belting approximately equal to or a significant percentage of the amount of stretch in the belt. In this way, when the belt moves to a position around the second lower rib height, there will be very little stretch, and hence tension, remaining in the belt.

First height 151 may be determined by the height of any edge features for engaging with the drive cap, such as protrusions 14 shown in FIG. 5. In some embodiments, offset rib 121 may be designed so that an end of an edge feature is configured to contact the face 142 of the cage bar cap 140. In other embodiments, offset rib 121 may be designed so that an end of an edge feature does not contact face 142 of cage bar cap 140. This choice is typically based on wear considerations. For example, the end of an edge feature on a metal link may be rough or sharp as a result of the link being punched from sheet metal material. In this case, it may be advantageous for offset rib 121 to support the link away from face 142 and prevent the rough end surface of an edge feature from wearing face 142 of cage bar cap 140. In the case of a molded plastic link, it may be preferable to design a flat wear surface on the end of the protrusion specifically to contact face 142 of the cage bar cap 140 to position a link or prevent wear on a tension-bearing portion of the link.

Taper angle 125 may be restricted by factors such as the belt tension, belt weight, and friction coefficient between the belt and cage bar cap. Taper angle 125 may be limited so that the radial force created by the belt tension is inhibited from causing an inside edge of the belt to lift off the support rails and move upward along the taper toward a portion of the drum with a smaller radius. In this regard, higher belt weight and higher coefficient of friction will also inhibit such movement. A minimum length of the taper may be determined by the difference in height between the first height 151 and second height 150 and the maximum taper angle 125 that will inhibit lifting the inside edge of the belt. However, the length of tapered section 112 can be as long as desired and may be as long at the offset rib 121 itself, e.g., offset rib 121 may have a continuous taper along a length of offset rib 121 so that offset rib 121 may have a continuously variable height.

In some embodiments, third height 150 may be between one-half (½) inch to two (2) inches. First height may be between ¼ inch to ⅜ inches. Tapered section 112 may taper at an angle 125 that is 30 degrees or less from third height 150 to first height 151. In other embodiments, any of these heights may be greater or lower than these ranges.

Offset rib 121 has a thickness 147. In this embodiment, thickness 147 is constant along the entirety of offset rib 121. Thickness 147 may be selected based on a number of factors, but is generally proportional to the rib height; when height of offset rib 121 increases, so does thickness 147. In such embodiments, the height-thickness proportion may be selected based upon the highest rib height, such as third height 150 in the embodiment shown FIG. 9. In some embodiments, offset rib 121 is structurally rigid enough to drive the belt without significant deflection, which may be considered to be more than approx. 5° from base surface 142, i.e. remaining at an angle that is 90° to 95° with respect to the face of cage bar cap). However in some embodiments, a positive drive system can operate with a drive face that is not perpendicular and is angled as much as 45° with respect to the face of the cage bar cap (i.e., ranging from 45 degrees to 135 degrees with respect to the cage bar cap), depending on belt tension, friction, etc. In such embodiments, any drive face may be correspondingly angled (as is known in the art, sprocket and gear faces are generally angled or curved in this way). In those embodiments where a conveyor belt includes edge features for engaging with the drive cap, such as protrusions 14 shown in FIG. 5, thickness 147 may be limited by any spacing between those belt edge features so that thickness 147 does not exceed that interstitial spacing. This spacing may vary as the belt may be collapsible to accommodate the curves of the spiral. In such cases, thickness 147 may be selected to accommodate the minimum spacing—the spacing between edge features when the belt is fully collapsed. Similar thickness restrictions may be placed on any rib discussed herein, including drive element 20 discussed above with respect to FIGS. 2-7.

In the embodiment shown in FIGS. 9 and 9A, offset rib 121 is positioned proximate third wall 133. As such, offset rib 121 is shifted away from a central axis 100 of cage bar cap 140 an offset D2 and is positioned a first distance D1 away from leading face 130. This offset may be beneficial in stiffening offset rib 121 due to additional support from third wall 133. Additionally, because offset rib 121 is essentially a smooth extension of third wall 133, a crevice is eliminated, which may inhibit an accumulation of debris on cage bar cap 140 and/or may make cage bar cap 140 easier to clean. It may also be easier to machine the contour of offset rib 121 by laying third wall 133 flat on a machining surface.

Figure 10:
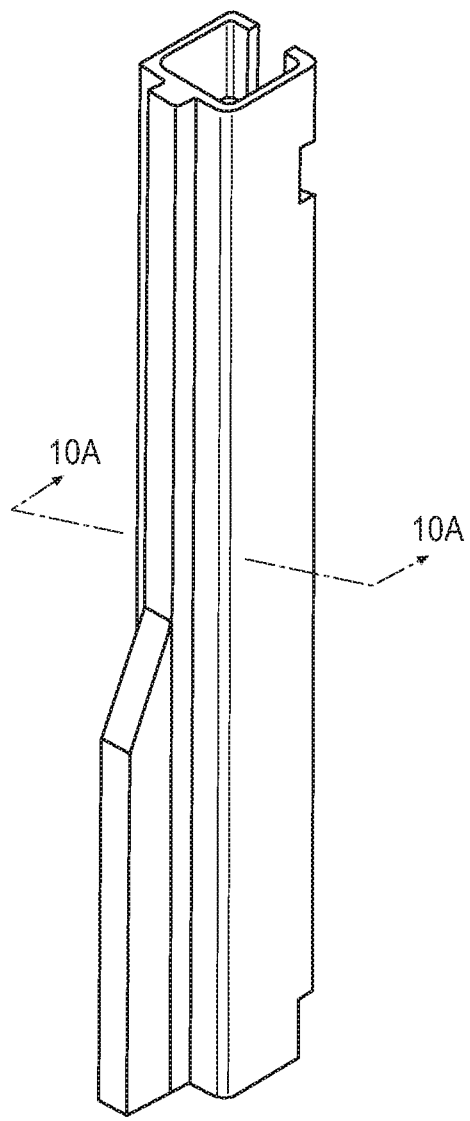
FIG. 10 is a perspective view of another embodiment of a cage bar cap having a protruding rib.

FIGS. 10 and 10A show a cage bar cap 240 that is essentially the same as cage bar cap 140, except that central rib 221 is aligned with central axis 200. In such symmetrical embodiments, the symmetry of cage bar cap 40 reduces necessary orientation during manufacturing, such as machining or extruding cage bar cap 140 and central rib 221. The symmetry also reduces part inventory as pre-machined parts may be used on either clockwise or counter-clockwise rotating systems.

An advantage common to the embodiments shown in FIGS. 9-10a is that these embodiments can be made easily and inexpensively, such as by extruding profiles corresponding to the cross sectional areas of FIGS. 9A and 10A. Extruded profiles can then be cut to length and the ribs machined to produce the desired contoured surfaces.

Figure 11:
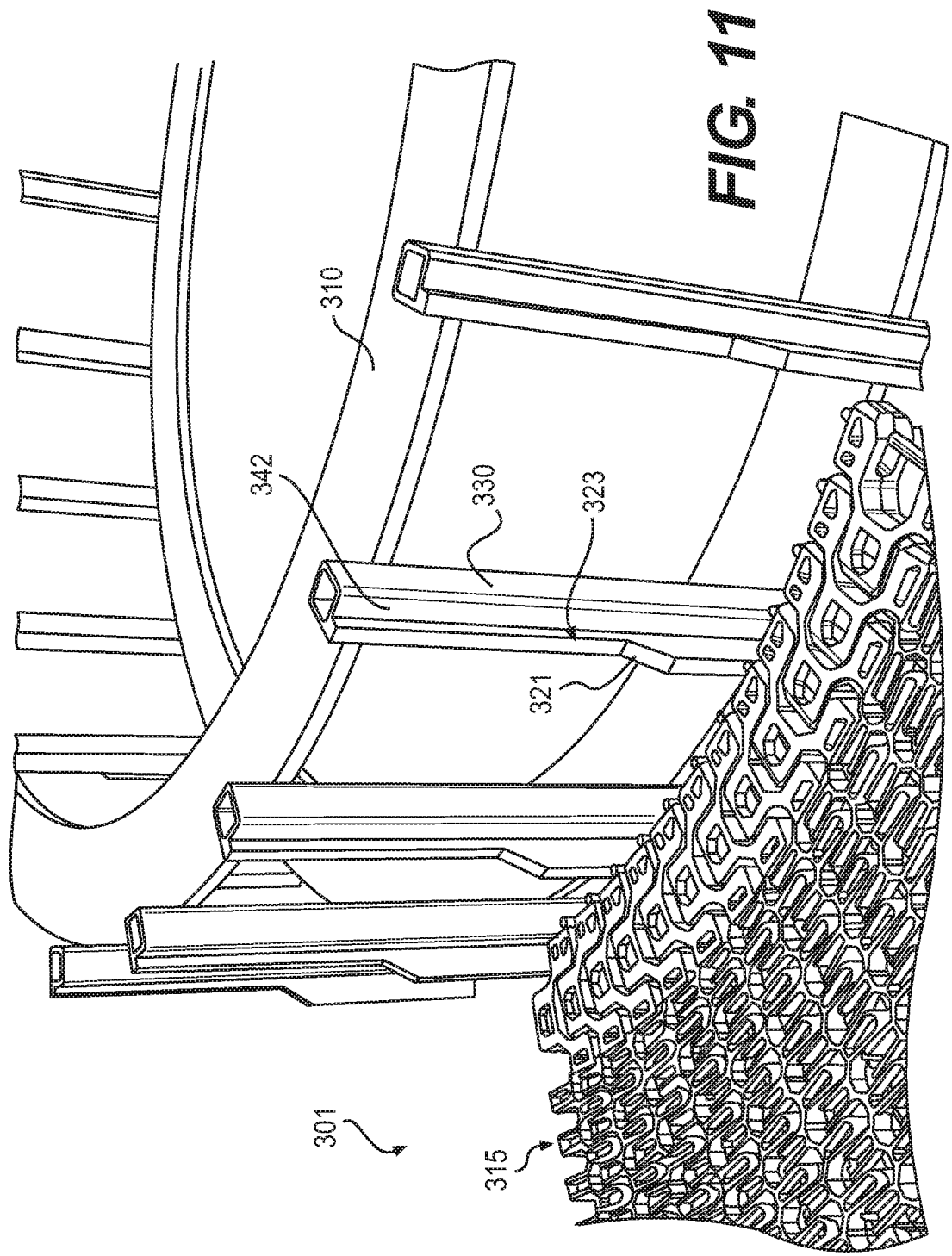
FIG. 11 is an enlarged perspective view of a spiral conveyor system showing drive elements with integrated protruding ribs.

In some embodiments, the cage bar itself may include a rib as opposed to separate cage bars and cage bar caps. For example, FIG. 11 shows an embodiment of a positive drive spiral conveyor system 301 that includes an offset rib 321 having a varying height contour surface 323 that is similar to offset rib 121 shown in FIG. 9. However, unlike FIG. 9, offset rib 321 extends away from a surface 342 of cage bar 330 instead of from a cage bar cap. Cage bar 330 is uncapped and attached to drum 310. In this embodiment, cage bar 330 and offset rib 321 form a single monolithic structure. System 301 otherwise is similar to or the same as any of the systems discussed above.

FIGS. 12 and 12A show another embodiment of a cage bar cap 440 configured to provide a contoured surface 423. Like the embodiment of cage bar cap 140 shown in FIG. 9 in most respects, cage bar cap 440 is configured to cover a cage bar (not shown). However, in this embodiment, cage bar cap 440 has some geometrical variations. Cage bar cap 440 includes a short offset rib 421. Short offset rib 421 is similar to offset rib 121, as short offset rib 421 extends away from a surface 442 of cage bar cap 440 offset rearward from a central axis 400 a distance 452 and a second distance 450 from leading face 430. Short offset rib 421 also varies in height along a height of cage bar cap 440.

Unlike offset rib 121, short offset rib 421 is not coextensive with cage bar cap 440. Short offset rib 421 extends from a top 463 of cage bar cap 440 to a terminus 424. Terminus 424 is separated from a bottom 464 of cage bar cap 440 by a distance 410 so that short offset rib 421 terminates short of the position at which conveyor belt 415 enters the spiral. This allows cage bar cap 440 to have a smooth bottom portion 497. Smooth bottom portion 497 may be beneficial in guiding a conveyor belt onto contoured surface 423 after allowing the links of the belt to collapse. Distance 410 may be any distance desired, but may be less than 25% of length of cage bar cap 440. Smooth bottom portion 497 may be wider than the rest of cage bar cap 440. In such embodiments, an angled transition portion 498 connects smooth bottom portion 497 with surface 442 to avoid possible jarring lateral motion of the belt as the belt engages short offset rib 421 and also to eliminate a possible niche which might be difficult to clean.

Also unlike offset rib 121, short offset rib 421 includes a chamfered edge 432. Chamfered edge 432 is positioned on an opposite side of short offset rib 421 to a drive face 445. Chamfered edge 432 may be provided to facilitate movement of the belt along short offset rib 421 and/or to facilitate manufacturing. Chamfered edge 432 extends away from trailing face 433 of cage bar cap 440 at an angle 430. Angle 430 may be any angle desired, but may in some embodiments be between 20 degrees and 90 degrees.

Figure 13:
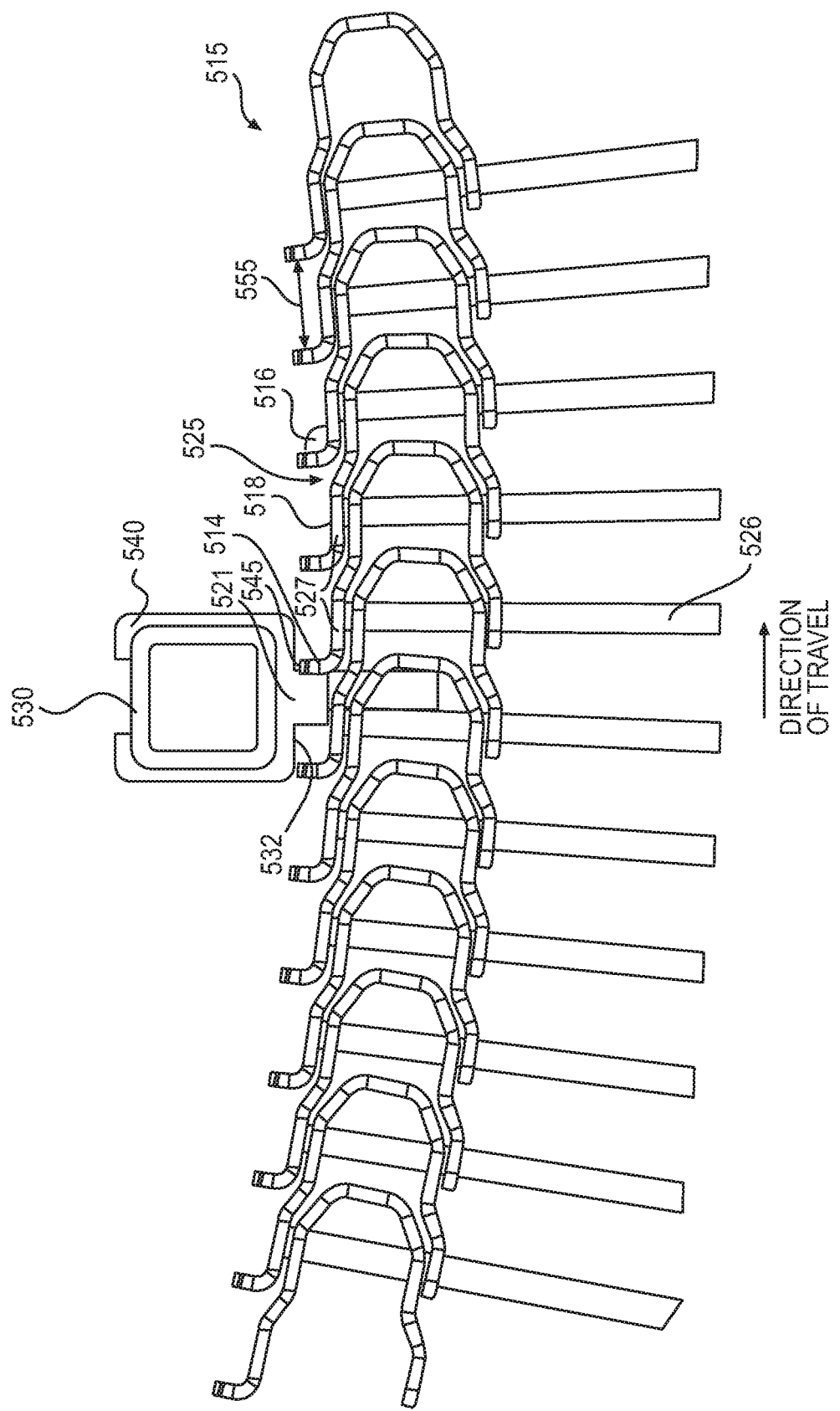
FIG. 13 is a partial enlarged plan view of a conveyor belt engaged with a rib of a cage bar cap.
Figure 14:
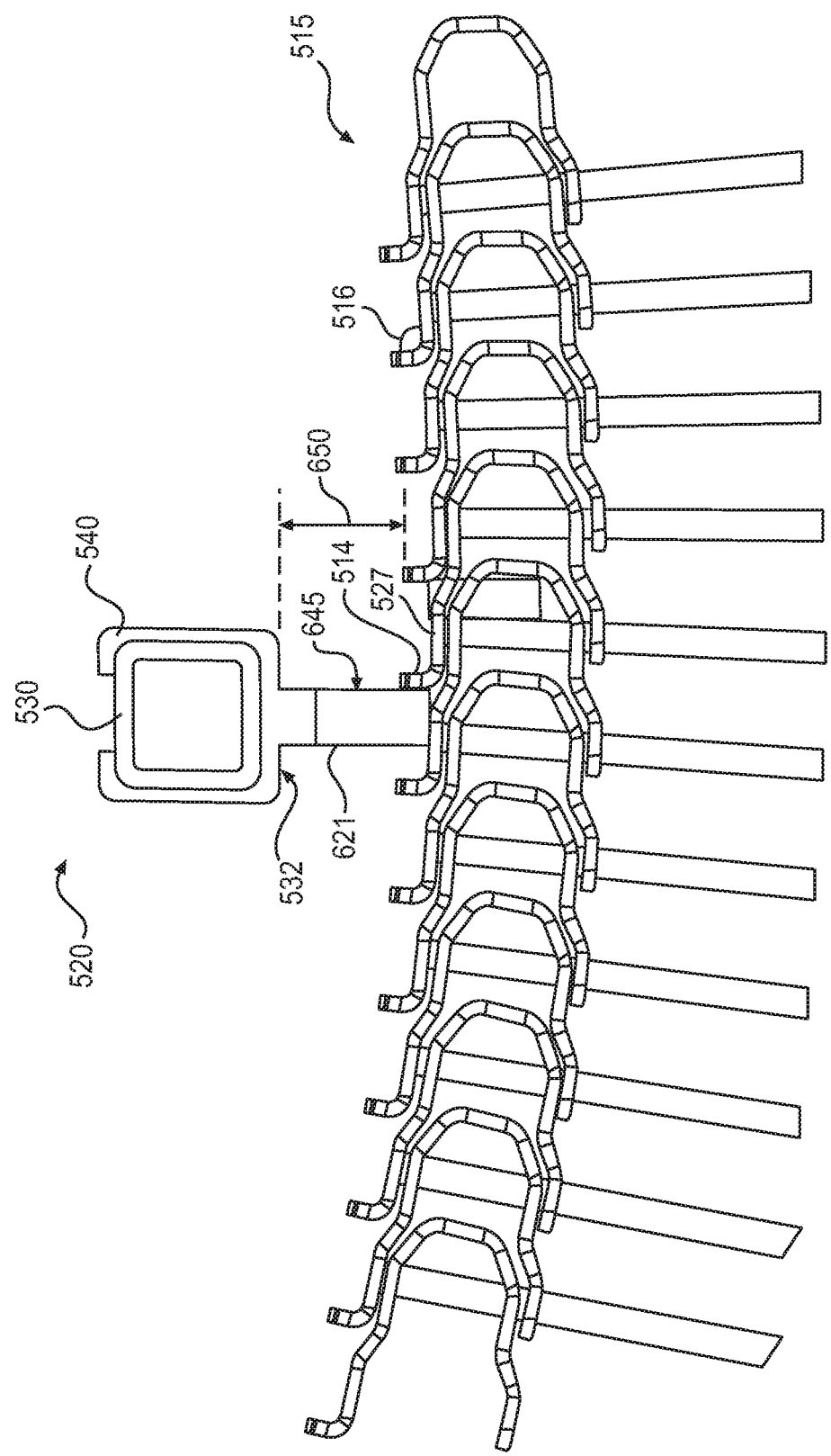
FIG. 14 is a partial enlarged plan view of a conveyor belt engaged with an elongated rib of a cage bar cap.

FIGS. 13 and 14 show an embodiment of how a cage bar cap 540 on a cage bar 530 may engage with a conveyor belt 515. For clarity, the drum is not shown, though cage bar 530 would be attached to a drum. Cage bar 530 and cage bar cap 540 is similar to any cage bar cap discussed above, though in this embodiment center rib 521 is centrally located on a front face 532 of cage bar cap 540. Center rib 521 includes a drive face 545 configured to engage with a portion of an edge link 527 of a metal belt 515.

In FIG. 13, metal belt 515 may include a plurality of generally U-shaped links 525 connected by rods 526 in any known manner that permits metal belt 515 to expand and collapse as it moves through a spiral. In this embodiment, all links 525 are edge links that form the outermost surfaces of metal belt 515. In this embodiment, edge links 527 include tabs 514 configured to engage with drive face 545. As shown, drive face 545 abuts tab 514 to firmly and yet removably engage metal belt 515 while tab 514 may touch or be spaced apart from surface 532. As discussed above with respect to FIG. 9, a thickness of center rib 521 may be limited by an interstitial space 555 between adjacent tabs of adjacent edge links 527, as center rib 521 is designed to fit easily into interstitial space 555. In some embodiments, center rib 521 may extend to edge link 527, while in other embodiments, center rib 521 may terminate short of edge link 527.

Tab 514 extends away from outer leg 518 of an edge link 527 at a tab angle 516. Tab angle 516 may be any desired angle, but may be between 20 degrees and 130 degrees. Tab 514 may include a flat face to provide a larger surface area for the engagement of drive face 545 with tab 514. In such embodiments, tab angle 516 may be about 90 degrees. In this embodiment, edge links 527 are made from a metal material. As such, tab 514 may be formed on outer leg 518 by bending a length of outer leg to the desired angle. Other methods of manufacturing such an edge feature are also contemplated, such as stamping edge link 527 into the desired shape.

FIG. 14 shows the embodiment of FIG. 13, but at a different portion of the rib where the rib portion 621 is at a greater height above surface 532 of cage bar cap 540 on a cage bar 530 of a driving element 520 may engage with a conveyor belt 515. For clarity, the drum is not shown, though cage bar 530 would be attached to a drum. Cage bar 530 and cage bar cap 540 are similar to any cage bar cap discussed above, though in this embodiment extended center rib portion 621 is centrally located on a front face 532 of cage bar cap 640. Center rib portion 621 includes a drive face 645 configured to engage with a portion of an edge link 527 of a metal belt 515.

Extended center rib portion 621 has a rib height 650 that is higher than a rib height of center rib 521 and the length of tab 514. This greater height allows for greater clearance between tab 514 and front face 532 for those embodiments where contact between tab 514 and front face 532 is not desired, such as when, for example, tab 514 may have a sharp edge that would increase wear of front 532 and potentially limit a lifespan of cage bar cap 540.

Figure 15:
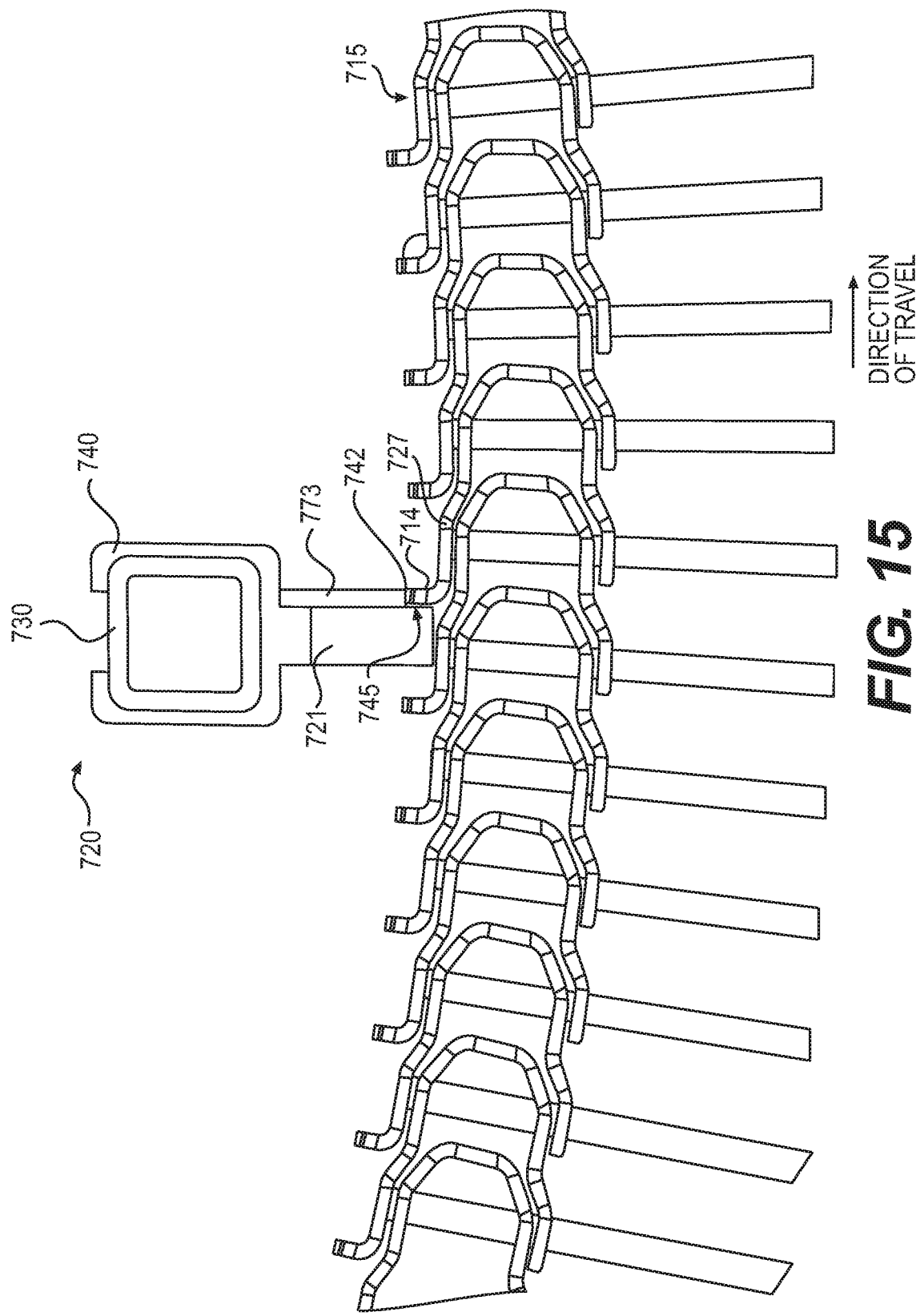
FIG. 15 is a partial enlarged plan view of a conveyor belt engaged with an elongated rib of a cage bar cap and a support surface.
Figure 16:
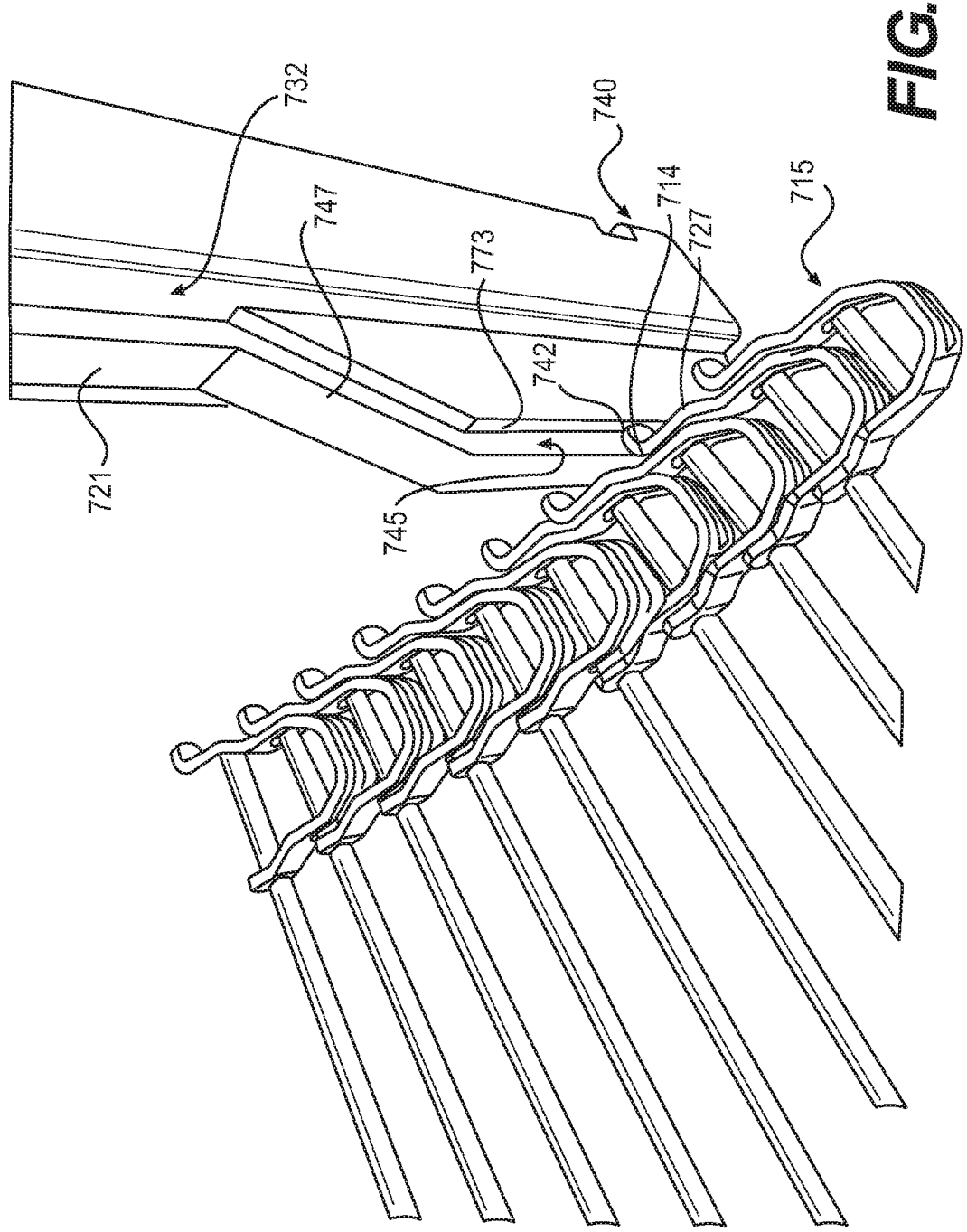
FIG. 16 is an enlarged perspective view of the system shown in FIG. 15, a conveyor belt engaged with an elongated rib of a cage bar cap and a support surface.

In some embodiments, such as the embodiment shown in FIGS. 15 and 16, a support structure 773 is provided adjacent to a guide rib 721. In this embodiment, a cage bar 730 and a cage bar cap 740 of a drive element 720 are the same as or similar to any cage bar or cage bar cap discussed above, particularly those with centrally positioned ribs such as cage bar cap 540. In this embodiment, a tabbed belt 715 is similar to metal belt 615 as discussed above, with edge links 727 having drive tabs 714.

Support structure 773 is sized and positioned so that when a drive face 745 is engaged with a first surface of drive tab 714 of an edge link 727, support structure 773 contacts a second surface of drive tab 714 at an engagement point 742 on support structure 773. In the embodiment shown in FIGS. 15 and 16, the first surface is substantially perpendicular to the second surface of drive tab 714. This engagement may lend additional stability to tabbed belt 715 as tabbed belt 715 travels through the spiral.

As shown in FIG. 16, support structure 773 may follow the geometry of guide rib 721 though support structure 773 does not extend as far above cage bar surface 732 as does guide rib 721. This configuration is so that engagement tab 714 may be nestled within the L-shape formed by guide rib 721 and support structure 773. For example, in those embodiments where guide rib 721 includes a tapered portion 747, support structure 773 also includes a taper.

Figure 17:
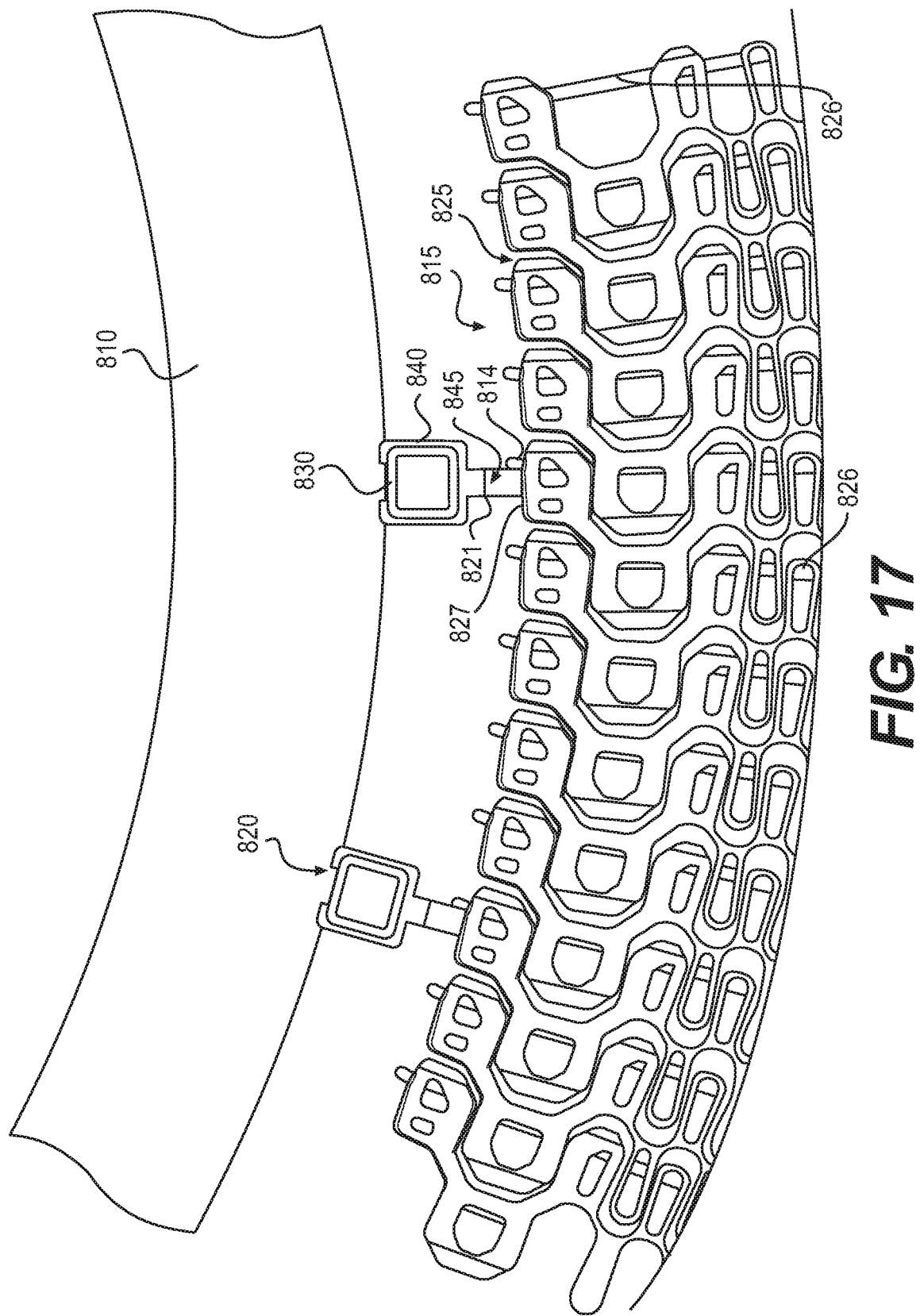
FIG. 17 is a partial plan view of a portion of an embodiment of a spiral conveyor system with drive elements with cage bars and cage bar caps, wherein the cage bar caps include protruding ribs.

As shown in FIG. 17, ribbed guide structures are not limited to embodiments with metal belts. FIG. 17 shows a plastic link belt 815 that is formed from a plurality of plastic links 825 joined by elongated rods 826. Elongated rods 826 may be made from metal or plastic. In this embodiment, a cage bar 830 and a cage bar cap 840 of a drive element 820 are the same as or similar to any cage bar or cage bar cap discussed above, particularly those cage bar caps with centrally positioned ribs such as cage bar cap 540.

In this embodiment, each pitch includes an edge link 827 from which a tab 814 protrudes towards an engagement rib 821. Tab 814 is similar to protrusion 14 as discussed above. Tab 814 may engage with engagement rib 821 in any manner discussed above. As shown in FIG. 17, multiple drive elements 820 may be engaged with different corresponding edge links 827 simultaneously.

Figure 18:
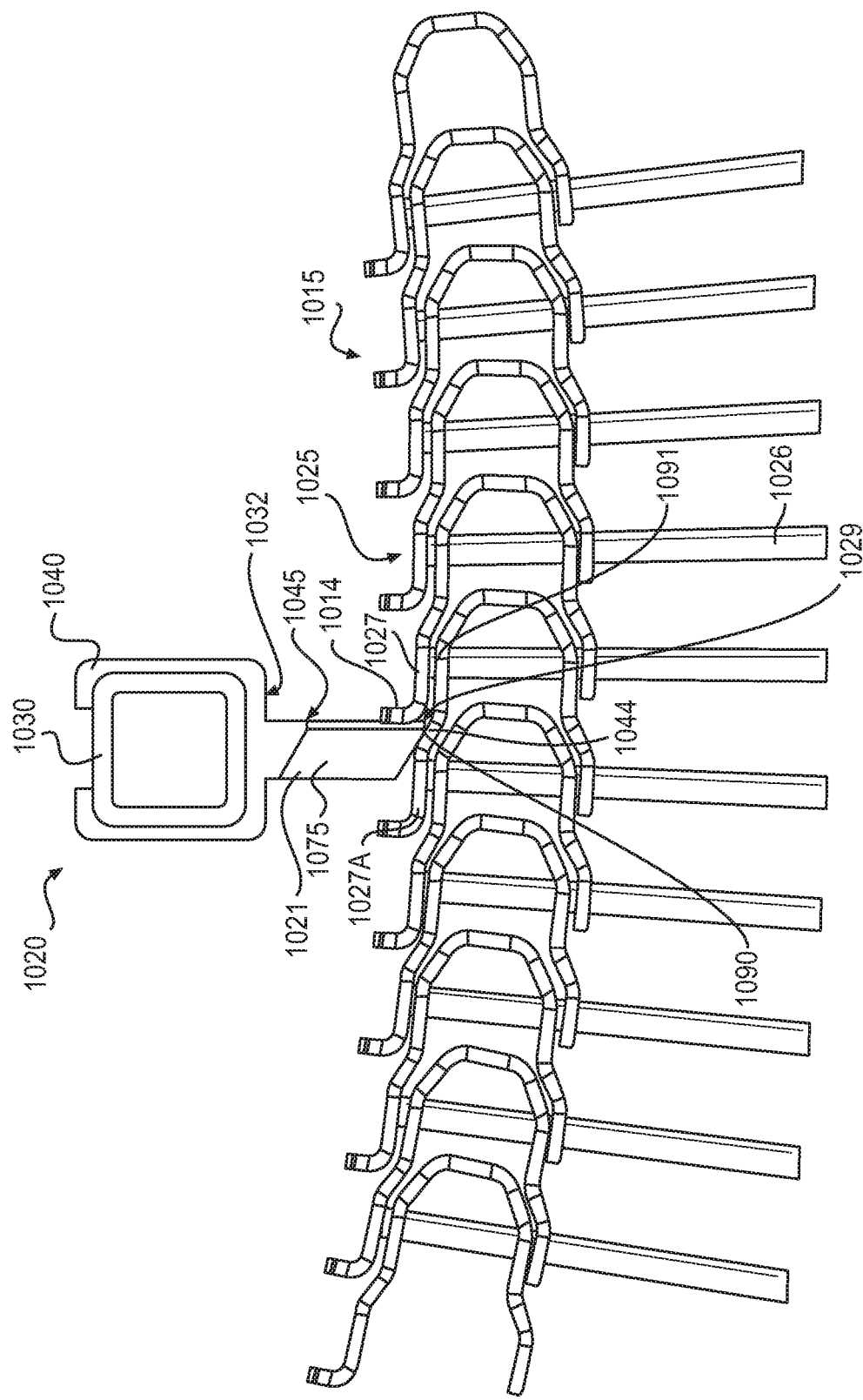
FIG. 18 is an enlarged view of another embodiment of a drive element engaged with a conveyor belt.

FIG. 18 shows how a chamfered rib 1021 may engage with a metal belt 1015. For clarity, the drum is not shown, though cage bar 1030 would be attached to a drum. Cage bar 1030 and cage bar cap 1040 are similar to any cage bar and cage bar cap, respectively, discussed above. In this embodiment chamfered rib 1021 is centrally located on a front face 1032 of cage bar cap 1040. Chamfered rib 1021 includes a drive face 1045 configured to engage with a portion of an edge link 1027 of a metal belt 1015.

In this embodiment, metal belt 1015 may include a plurality of generally U-shaped links 1025 connected by rods 1026 in any known manner that permits metal belt 1015 to expand and collapse as it moves through a spiral. In this embodiment, all links 1025 are edge links 1027 that form the outermost surfaces of metal belt 1015. In this embodiment, edge links 1027 include tabs 1014 configured to extend away from an edge link 1027 and engage with drive face 1045. As shown, drive face 1045 abuts tab 1014 to firmly and yet removably engage metal belt 1015.

Tab 1014 may include a flat face to provide a larger surface area for the engagement of drive face 1045 with tab 1014. In this embodiment, edge links 1027 are made from a metal material. As such, tab 1014 may be formed by bending a length of an outer leg of edge link 1027 to a desired angle. Other methods of manufacturing such an edge feature are also contemplated, such as stamping edge link 1027 into the desired shape.

Because chamfered rib 1021 has a chamfered surface 1075, chamfered rib 1021 essentially terminates at a point 1044. Point 1044 is thin enough to slide past tab 1014 and into a niche 1029 between tab 1014 and an adjacent edge link 1027A when tab 1014 is engaged with drive face 1045. Such an engagement may be more stable and secure than ribs that lack a chamfered edge or other point-like terminal ends. Chamfered surface 1075 may be angled to correspond to an angled portion 1090 of edge link 1027. Chamfered surface 1075 may permit separation of edge links 1027 and 1027A such that point 1044 may contact link surface 1091. As will be recognized by those in the art, any chamfered surface of any embodiment disclosed herein or adapted to have a chamfered surface may also serve as the contoured surface or a portion of the contoured surface.

Figure 19:
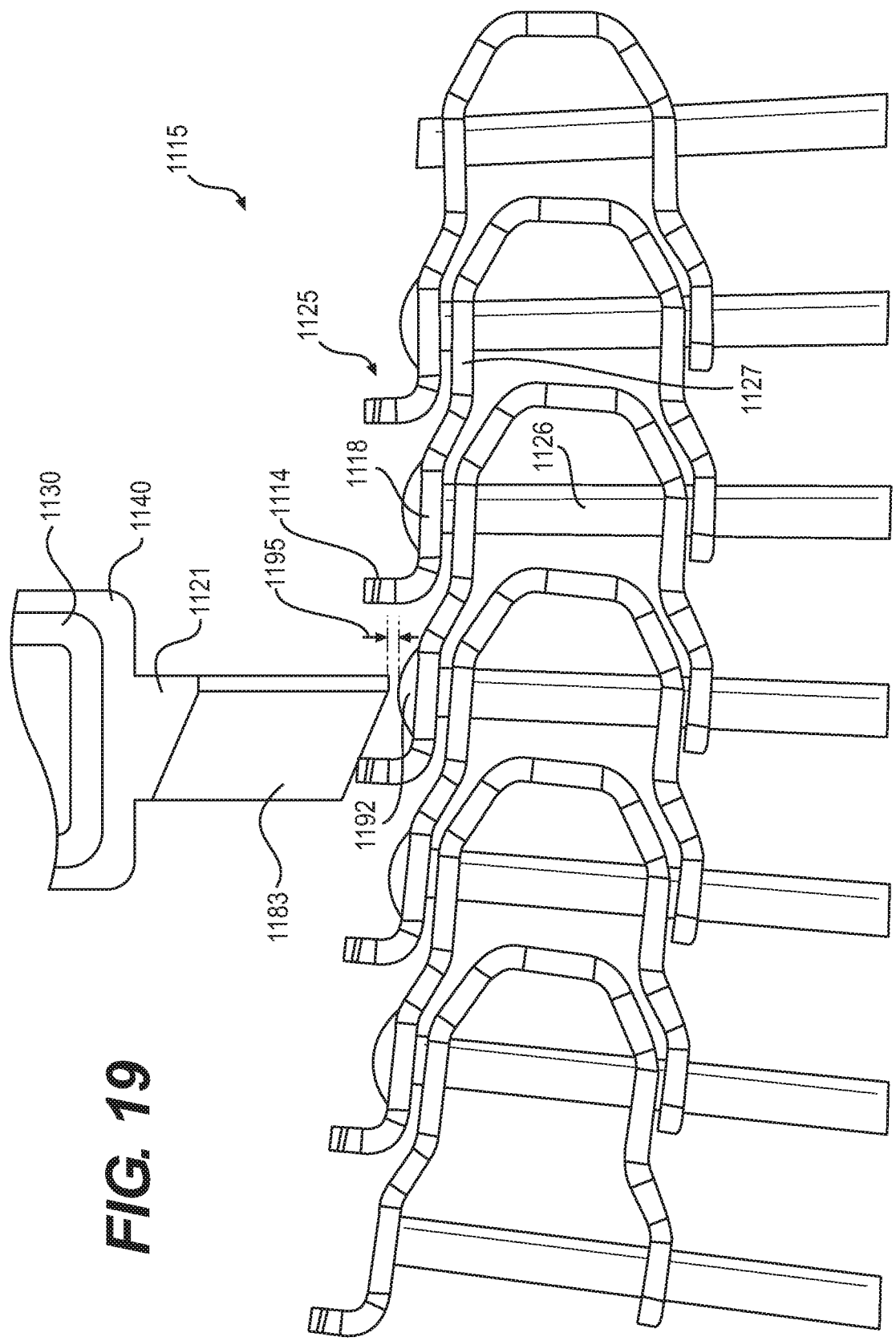
FIG. 19 is an enlarged view of an embodiment of a drive element engaged with a conveyor belt showing the clearance between the rib and the belt.

In some embodiments, conveyor belts may include edge features other than edge features for engaging with a positive drive system. For example, as shown in FIG. 19, a buttonless belt 1115 may include welds 1192 that cover the ends of elongated rods 1126. While welds 1192 may be smooth, welds 1192 may protrude away from an outer leg 1118 of an edge link 1127. Edge link 1127 may also include an engagement tab 1114 similar to protrusion 14 or any other tab described above, particularly tab 114, an angled portion of an outer leg of an edge link.

A chamfered rib 1121 of cage bar cap 1140 may engage with buttonless belt 1115. Cage bar 1130 and cage bar cap 1140 is similar to any cage bar cap discussed above. In this embodiment chamfered rib 1121 is similar to chamfered rib 1021 discussed above and is centrally located on cage bar cap 1140. In some embodiments, rib 1121 may be sized and dimensioned so that rib 1121 has a clearance gap 1195 between chamfered edge 1183 and welds 1192 as rib 1121 moves towards an engagement position with an engagement tab 1114. This arrangement may prevent or inhibit unwanted motion that would otherwise occur if rib 1121 were to come into contact with weld 1192. This arrangement may also prevent engagement with weld 1192, which may undesirably wear either or both of rib 1121 and weld 1192.

Figure 20:
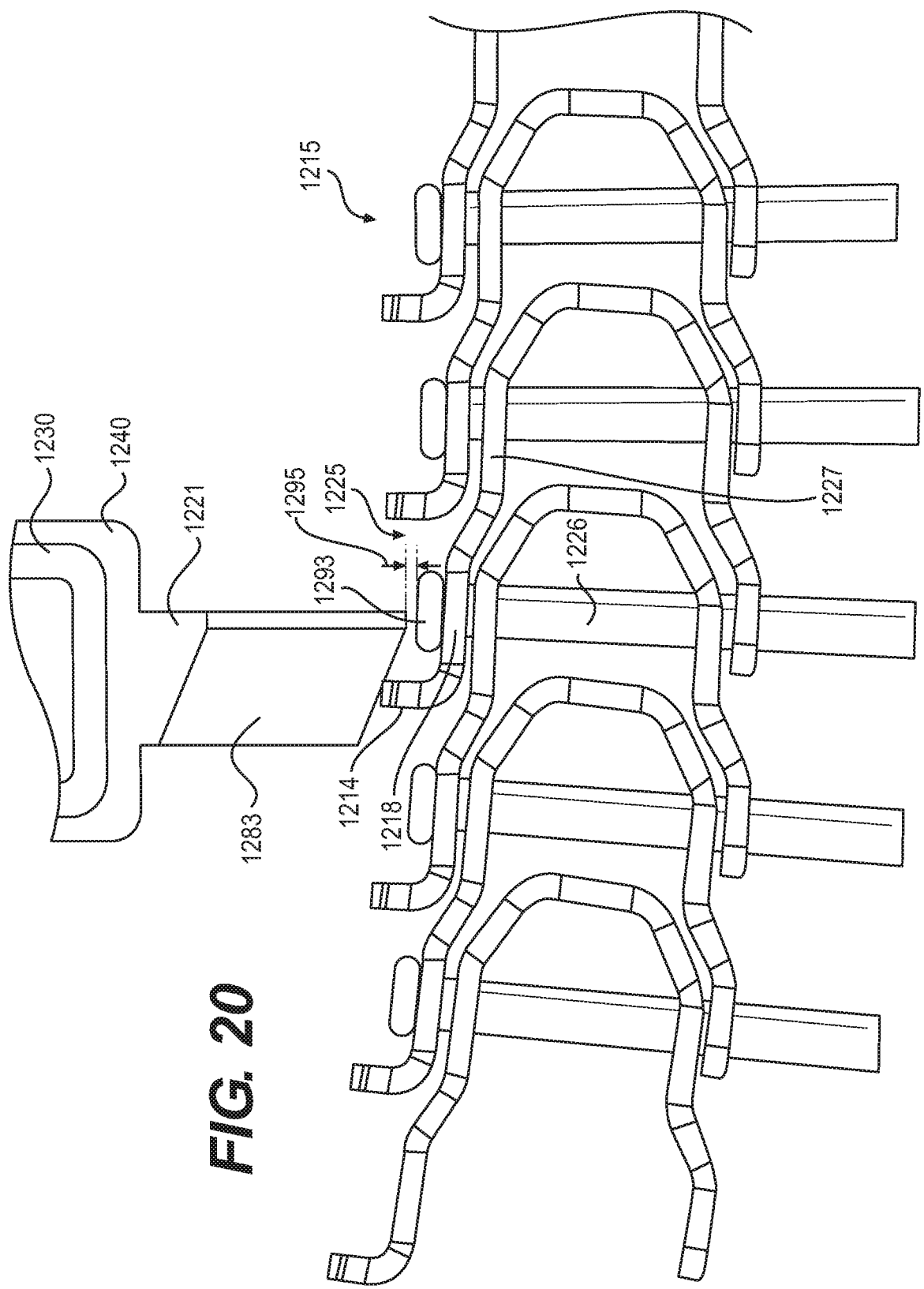
FIG. 20 is an enlarged view of an embodiment of a drive element engaged with a conveyor belt showing the clearance between the rib and a buttonhead of the belt.

FIG. 20 shows a similar clearance when a chamfered rib 1283 engages with a buttonhead belt 1215. Buttonhead belt 1215 may include buttonheads 1293 that cover the ends of elongated rods 1226. While buttonheads 1293 may be smooth, buttonheads 1293 may protrude away from an outer leg 1218 of an edge link 1227. Edge link 1227 may also include an engagement tab 1214 similar to protrusion 14 or any other tab described above, particularly tab 124, an angled portion of an outer leg of an edge link.

A chamfered rib 1221 of cage bar cap 1240 may engage with buttonhead belt 1215. Cage bar 1230 and cage bar cap 1240 is similar to any cage bar cap discussed above. In this embodiment chamfered rib 1221 is similar to chamfered rib 1021 discussed above and is centrally located on cage bar cap 1240. In some embodiments, chamfered rib 1221 may be sized and dimensioned so that rib 1221 has a clearance gap 1295 between chamfered edge 1283 and buttonheads 1293 as chamfered rib 1221 moves towards an engagement position with an engagement tab 1214. This arrangement may prevent or inhibit unwanted motion that would otherwise occur if chamfered rib 1221 were to come into contact with buttonhead 1293. This arrangement may also prevent engagement with buttonhead 1293, which may undesirably wear either or both of chamfered rib 1221 and buttonhead 1293.

Figure 21:
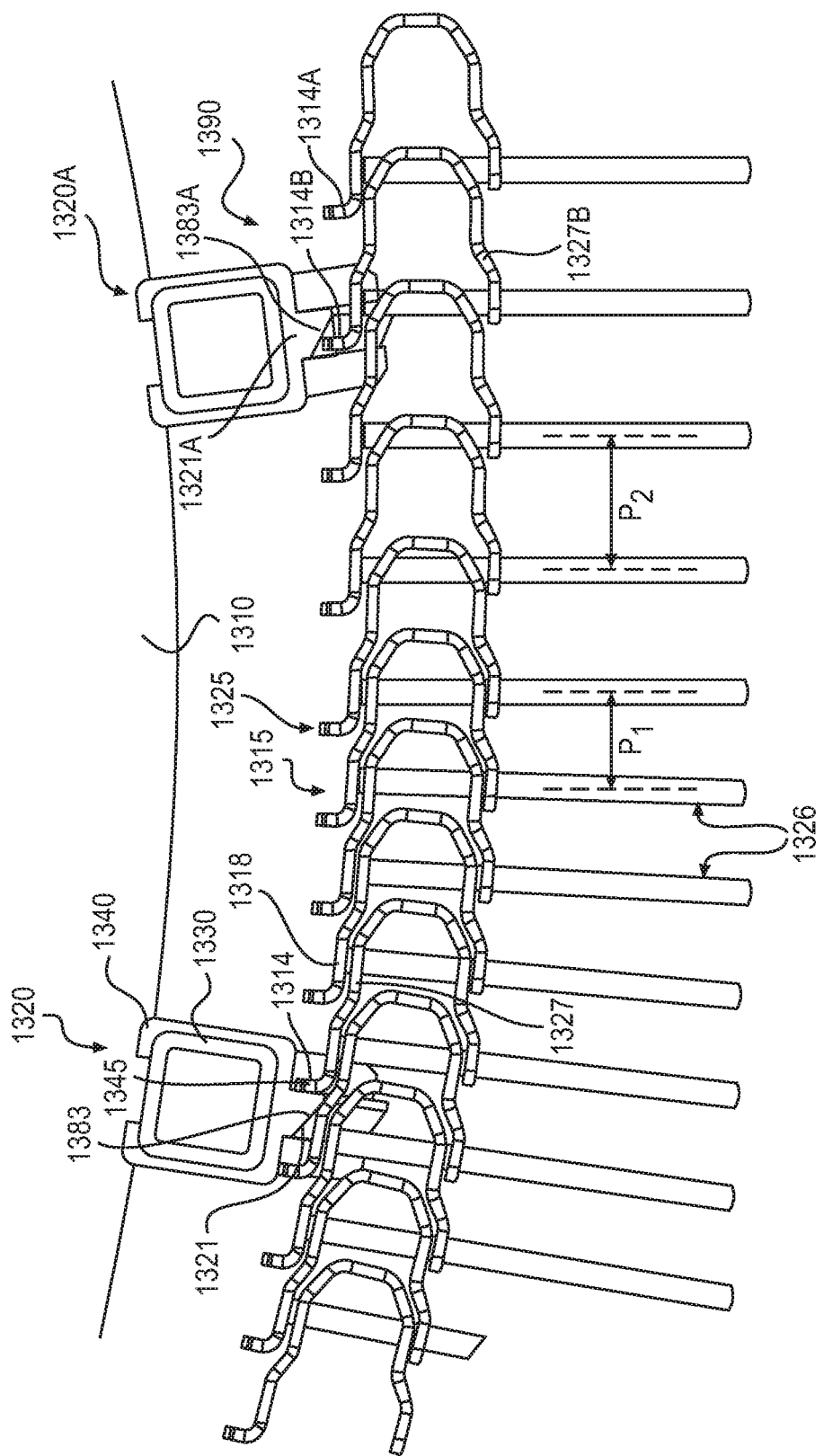
FIG. 21 is an enlarged plan view of an embodiment of a drive system for a conveyor belt showing an engaged drive element and a disengaged drive element.

FIG. 21 shows an embodiment of how drive elements 1320 including a cage bar 1330 and a cage bar cap 1340 on a cage bar 1330 may engage with a conveyor belt 1315. Cage bar 1330 is attached to a drum 1310. Drum 1310, cage bar 1330, and cage bar cap 1340 are similar to any drum, cage bar, and cage bar cap, respectively, discussed above, though in this embodiment rib 1321 is centrally located on a front face of cage bar cap 1340. Chamfered center rib 1321 includes a drive face 1345 configured to engage with a portion of an edge link 1327 of a metal belt 1315.

In this embodiment, metal belt 1315 may include a plurality of generally U-shaped links 1325 connected by rods 1326 in any known manner that permits metal belt 1315 to expand and collapse as it moves through a spiral. In this embodiment, edge links 1327 include tabs 1314 configured to engage with drive face 1345. As shown, rib 1321 abuts tabs 1314 to firmly and yet removably engage metal belt 1315. Tabs 1314 extend away from outer leg 1318 of an edge link 1327 and are similar to tabs 514 discussed above with respect to FIG. 13.

FIG. 21 shows how a top tier 1390 of a spiral may exit the spiral and head to a return path, such as return path 104 as shown in FIG. 1. In FIG. 21, first drive element 1320 is engaged with a tab 1314, while second drive element 1320A is disengaging from tab 1314A. At the point of disengagement, links 1325 expand from a first collapsed pitch P1 to a second expanded pitch P2, resulting in forward movement of links 1325 with respect to ribs 1321 and 1321A. The sharp angle of chamfered edge 1383A results in no rib material blocking or inhibiting movement of tab 1314B. In some embodiments, tab 1314B may even slide along chamfered edge 1383 for a smooth, not sudden, movement of tab 1314B past rib 1321A. Sudden catching and disengagement of the tabs from the drive elements may damage the drive elements and place unintended forces on the belt which may reduce the useful life of the belt. In some extreme cases, a sudden disengagement may derail the conveyor belt and/or jar conveyed product in undesirable ways.

Figure 22:
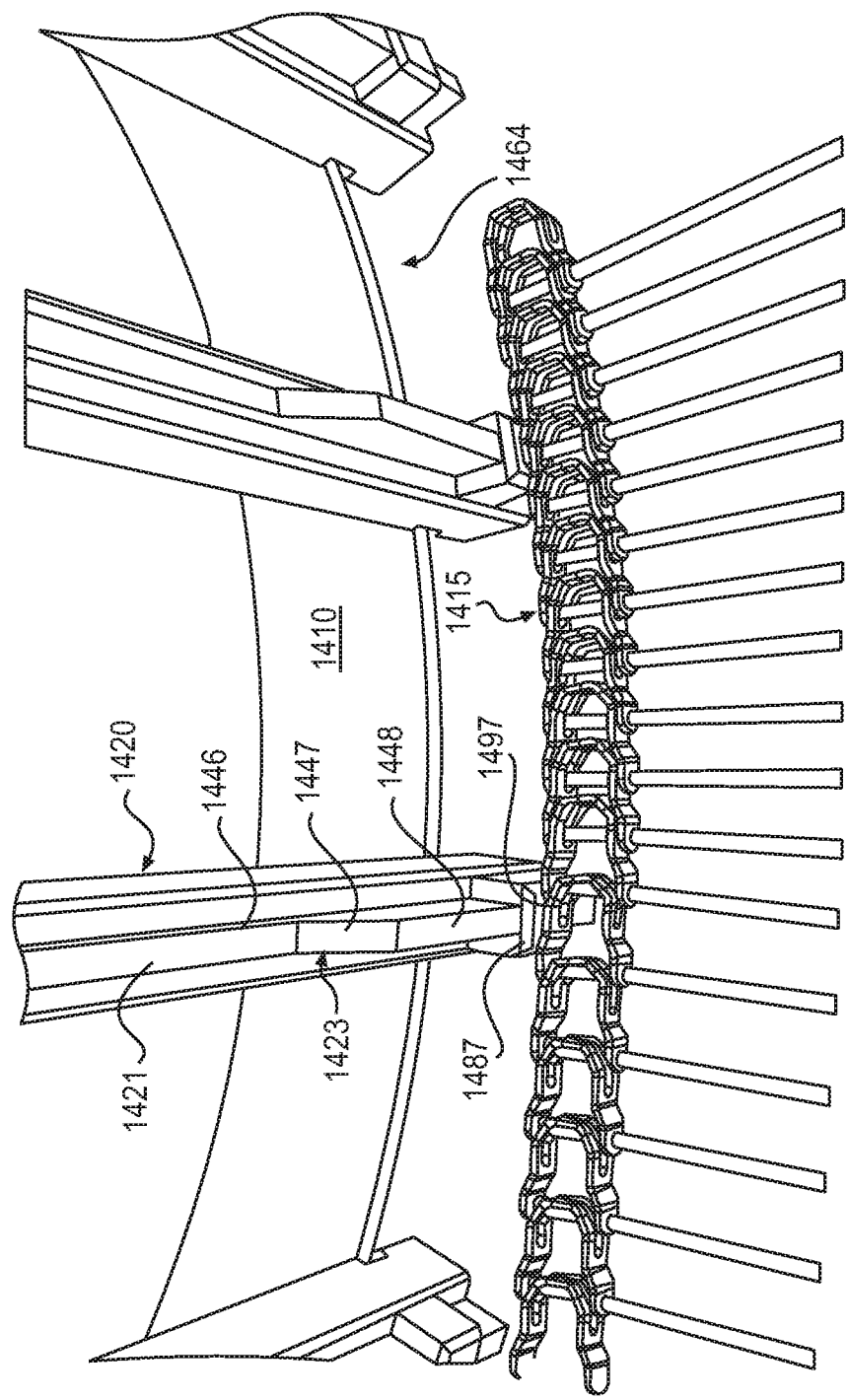
FIG. 22 is an enlarged perspective view of a bottom of a spiral conveyor system showing drive elements with cage bar caps each having a protruding rib having a drive face to engage with the conveyor belt and a smooth belt entrance surface.
Figure 23:
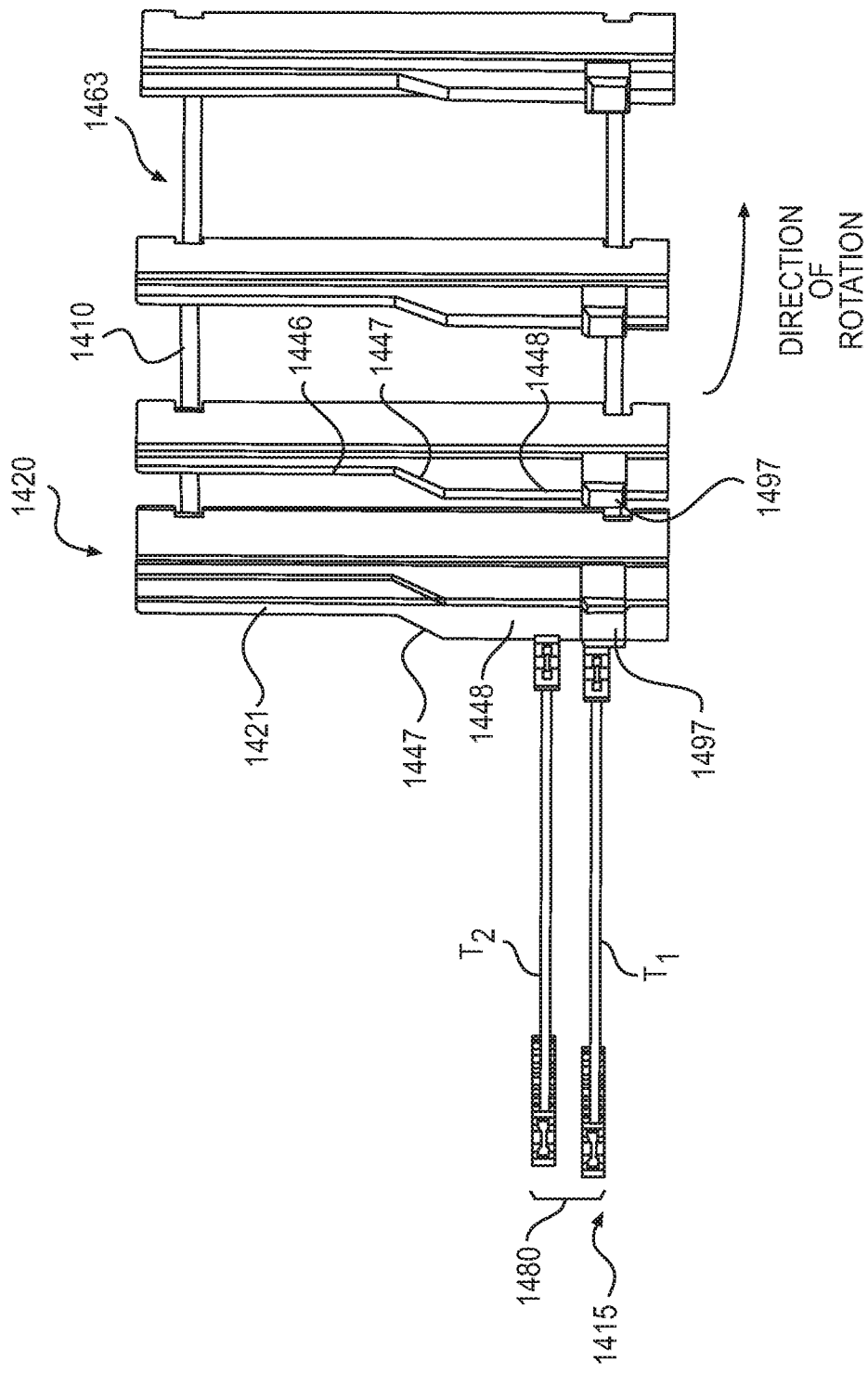
FIG. 23 is a perspective view of an embodiment of a bottom of a spiral conveyor showing the belt engaging with the drive elements having a smooth belt entrance surface.
Figure 24:
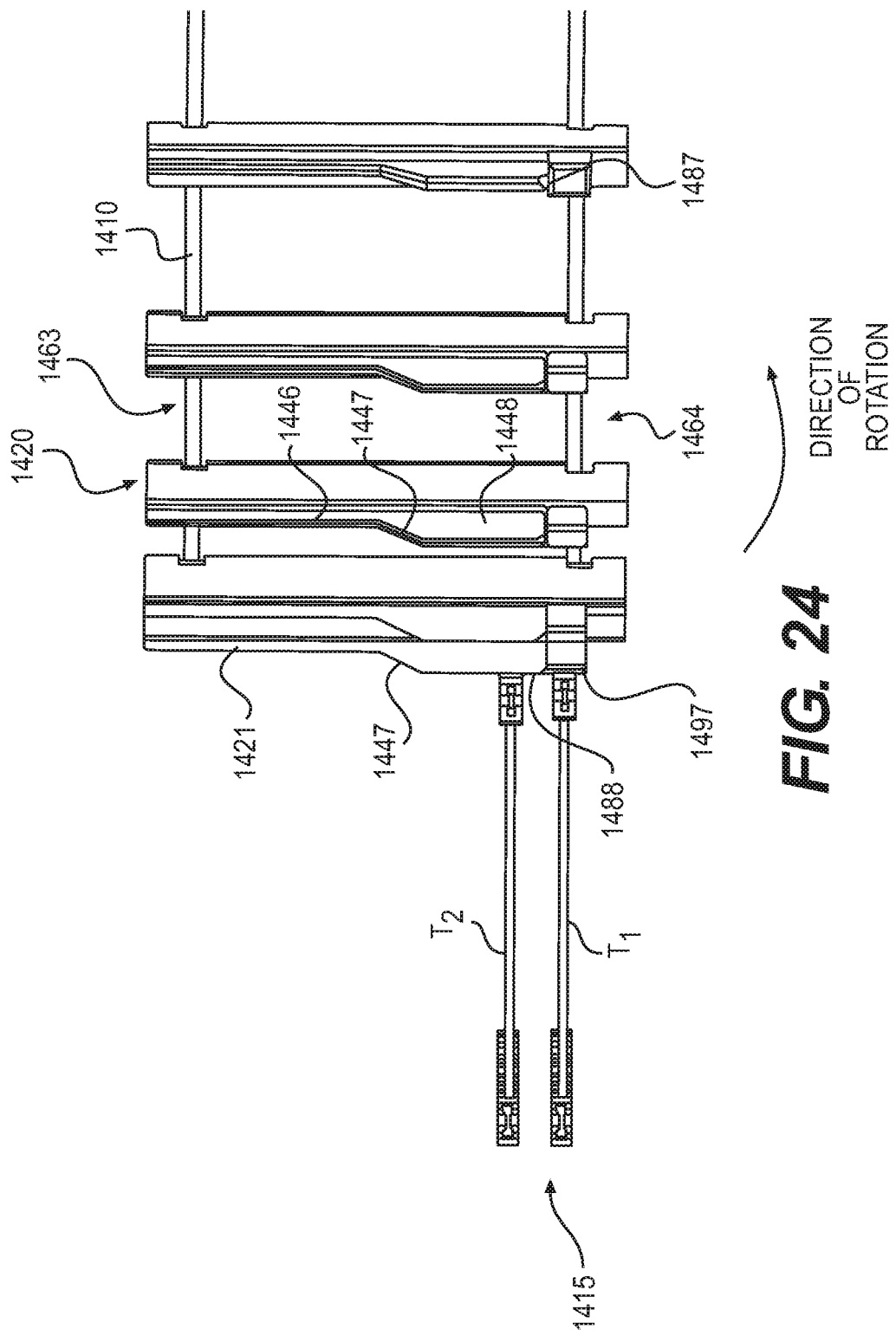
FIG. 24 is an enlarged perspective view of an embodiment of an engagement of an edge link of a conveyor belt with a drive element that has a protruding rib and a support surface.

Similarly, a jarring engagement with the drum at a spiral entrance may produce undesirable results. FIGS. 22-24 show how a smooth bottom portion 1497 can help to ease belt 1415 onto a rib 1421. A drum 1410, which is similar to any drum discussed above, includes multiple drive elements 1420 with contoured surfaces 1423. Rib 1421 is a protrusion that extends away from a base surface of drive element 1420 towards belt 1415. Similar to contoured surface 23 discussed above with respect to FIG. 6, contour surface 1423 includes a flat lower section 1448 at a first height above the base surface of drive element 1420, an upper section 1446 at a second, lower height above the base surface of drive element 1420, and a tapered section 1447 that continuously joins lower section 1448 to upper section 1446.

In this embodiment, drive element 1420 may have a smooth bottom portion 1497 that is similar to smooth bottom portion 497 discussed above. Smooth bottom portion 1497 may be beneficial in guiding a conveyor belt onto contoured surface 1423 after allowing the links to collapse. In some embodiments, smooth bottom portion 1497 may be wider than the rest of drive element 1420. In such embodiments, an angled transition portion 1487 connects smooth bottom portion 1497 with an outermost surface of lower section 1448 to avoid possible jarring motion of the belt as the belt connects with rib 1421, as belt 1415 has an opportunity to first transition from being frictionally driven by drive element 1420 before beginning the trip up the spiral on rib 1421 from spiral bottom 1464 to spiral top 1463. In this embodiment, that transition is further eased because bottom portion 1497 has a greater diameter than lower section 1448, where the additional tension in a more expanded belt being held at a greater diameter can release onto the lower diameter rib 1421 as belt 1415 moves from a first position T1 to a second position T2. In FIG. 24, bottom portion 1497 has essentially the same or a slightly smaller diameter than flat lower section 1448 of rib 1421. Due to the overlapping engagement of the link tabs with lower section 1448, belt 1415 at T2 may have the same or slightly smaller diameter than belt 1415 at T1. A chamber at the bottom of section 1448 provides a smooth transition from bottom portion 1497 to flat lower section 1448. In such embodiments, lateral movement is minimized as links 1425 engage ribs 1421.

Figure 25:
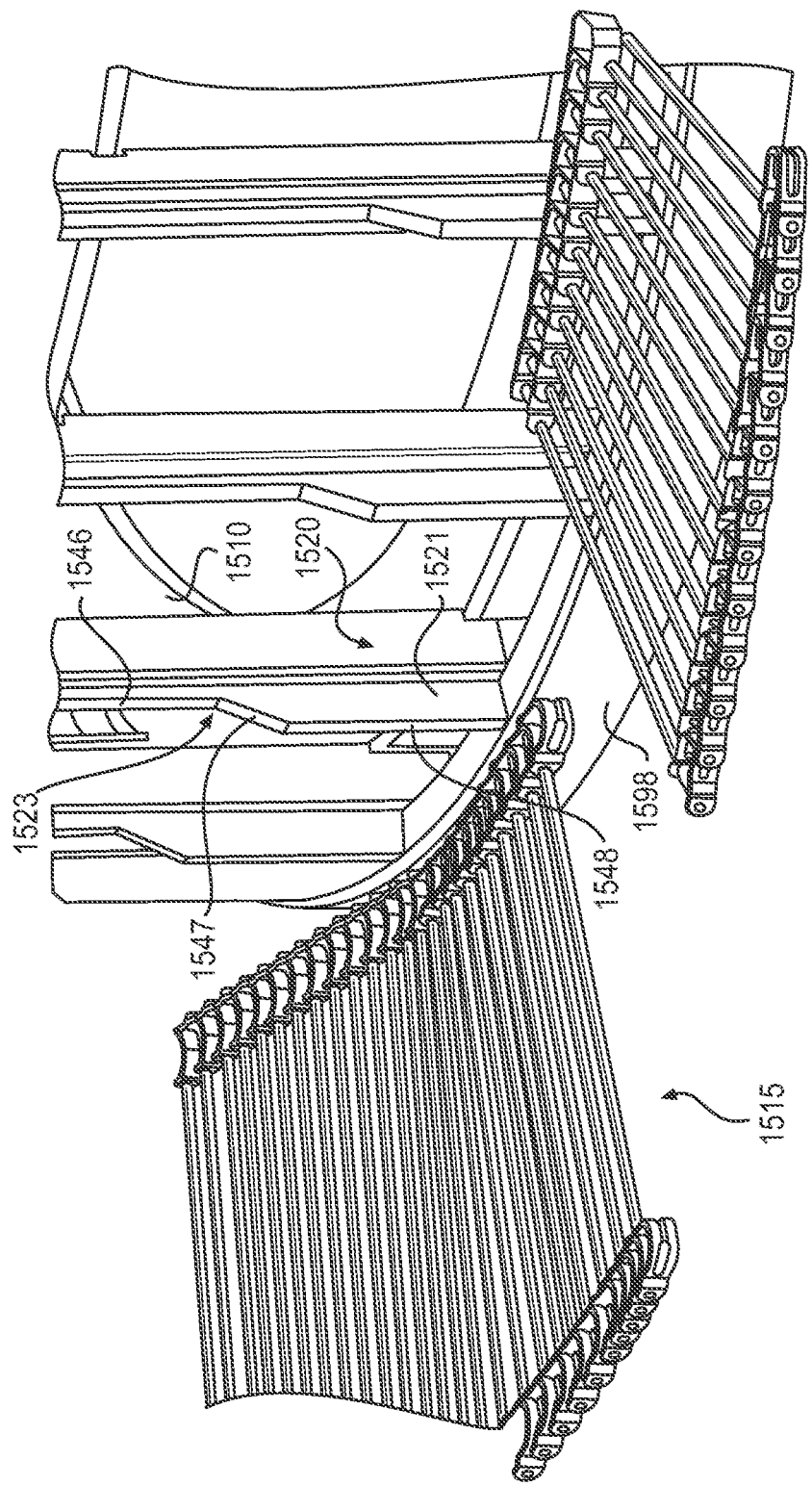
FIG. 25 is a perspective view of an embodiment of a bottom of a spiral conveyor showing the belt engaging with a ring having a smooth belt entrance surface.

In another embodiment, shown in FIG. 25, instead of a flat bottom portion of a drive element providing the larger diameter, smooth surface for onboarding to a rib, drum 1510 includes a lower ring 1598 that is approximately the same diameter as a lower portion 1548 of a rib 1521. Rib 1521 is associated with a drive element 1520 of drum 1510. Rib 1521 includes a flat lower section 1548 at a first height above the base surface of drive element 1520, an upper section 1546 at a second, lower height above the base surface of drive element 1520, and a tapered section 1547 that continuously joins lower section 1548 to upper section 1546. Drum 1510, drive element 1520, and rib 1521 may have the same features as any drum, drive element, or rib, respectively, discussed above. Ring 1598 performs the same or a similar function as bottom portion 1497 discussed above by allowing belt 1515 to collapse on smooth ring 1598, then drum 1510 advances belt 1515 on to positively engage rib 1521.

Figure 26:
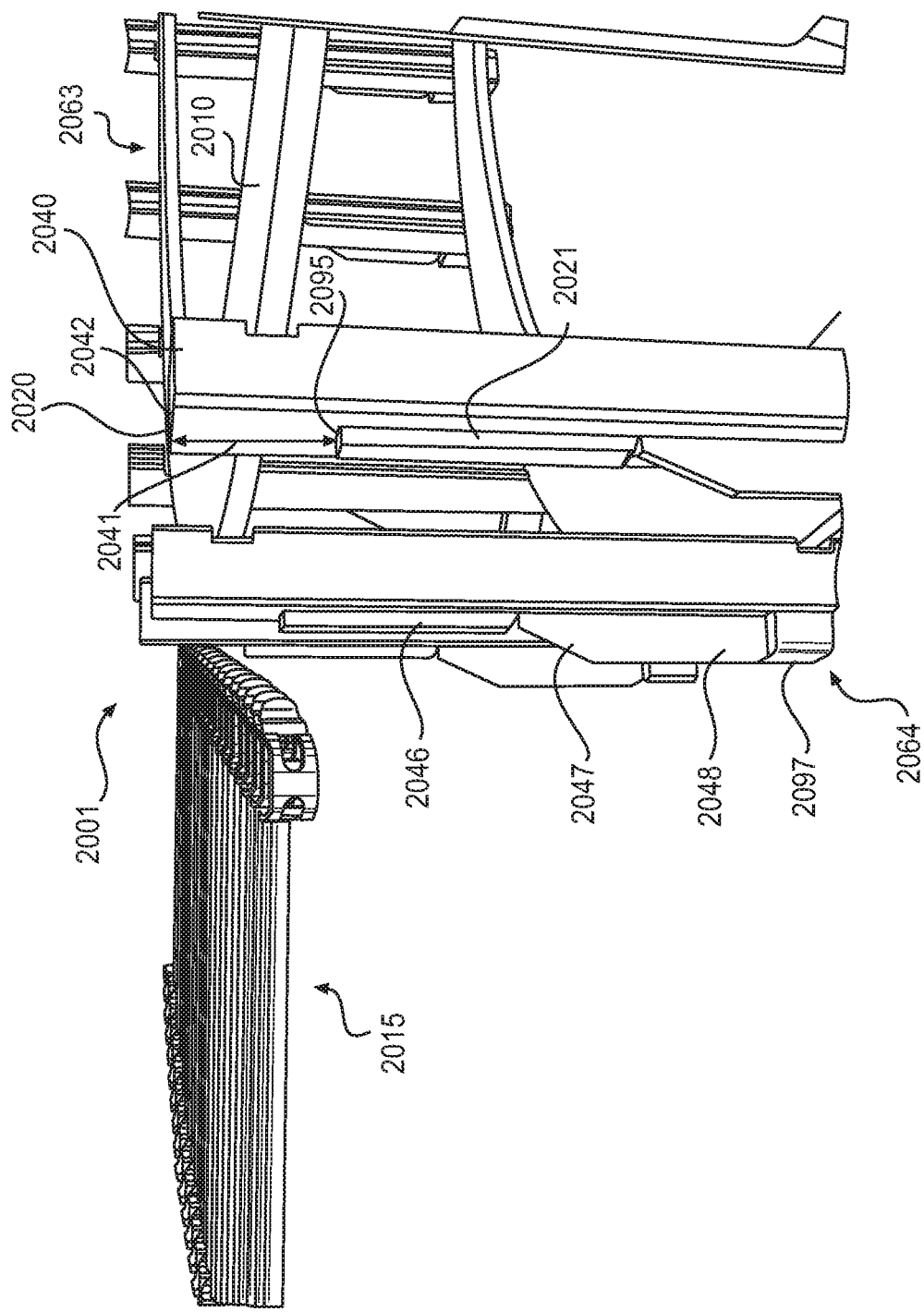
FIG. 26 is a perspective view of an embodiment of a top of a spiral conveyor showing a belt disengaging from a drum.

FIG. 26 shows an embodiment of a drum 2010 that includes a similar ribless portion 2041 of a drive element 2020 proximate a top 2063 of system 2001. In this embodiment, drum 2010, drive element 2020, cage bar cap 2040, and rib 2021 may be similar or the same as any drum, drive element, cage bar cap, and rib discussed above. Similar to rib 1521, rib 2021 includes a flat lower section 2048 at a first height above the base surface of cage bar cap 2040, an upper section 2046 at a second, lower height above the base surface of cage bar cap 2040, and a tapered section 2047 that continuously joins lower section 2048 to upper section 2046.

Proximate bottom 2064, drive bar cap 2040 includes a smooth bottom portion 2097 that is similar in form and function to smooth bottom portion 1497 as discussed above. Ribless portion 2041 performs a similar function proximate top 2063. In embodiments where rib 2021 terminates at an upper point 2095 on cage bar cap 2040. Upper point 2095 is separated from a cage bar top 2042 of cage bar cap 2040 so that rib 2021 terminates short of the position at which conveyor belt 2015 exits the spiral. Ribless portion 2041 allows for belt 2015 to expand unhindered. This may allow for more tension control of belt 2015 as belt 2015 exits the spiral and is pulled by a take up reel such as take up roller 115 shown in FIG. 1, which may inhibit slippage of belt 2015.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or as a substitute for any other feature or element in any other embodiment unless specifically restricted. Accordingly, the embodiments are not to be restricted except in light of the attached claims and their equivalents. Also, various modifications and changes may be made within the scope of the attached claims.

The invention claimed is:

1. A spiral conveyor system comprising:
a drum associated with a motor, wherein the drum extends from a drum bottom to a drum top;
a conveyor belt traveling helically about the drum from an entrance end of the drum to an exit end of the drum;
a rib associated with the drum, wherein the rib extends radially from a surface of the drum;
wherein the rib includes at least one drive face;
wherein the conveyor belt includes at least one belt surface configured to engage the at least one drive face;
wherein the length of the rib extends along the length of the drum from a first end of the rib to a terminus of the rib proximate the entrance end of the drum;
wherein the drum includes a ring that extends between the terminus of the rib and the entrance end of the drum;
wherein the surface of the drum defines a first diameter of the drum; and
wherein the ring has a diameter that is larger than the first diameter of the drum.

2. The spiral conveyor system of claim 1, wherein the rib defines a second diameter of the drum; and
wherein the ring has a diameter that is approximately the same as the second diameter of the drum defined by the rib at the terminus of the rib.

3. The spiral conveyor system of claim 1, wherein the rib defines a second diameter of the drum; and
wherein the ring has a greater diameter than the second diameter of the drum defined by the rib at the terminus of the rib.

4. The spiral conveyor system of claim 1, wherein the rib has a first height at the terminus;
wherein the first height is the maximum height of the rib along the length of the rib; and
wherein at least a portion of the rib has a tapered height.

5. The spiral conveyor system of claim 1, wherein the first end of the rib is spaced from the exit end of the drum such that the drum includes a ribless portion at the exit end of the drum.

6. The spiral conveyor system of claim 1, wherein the drum includes a plurality of drive elements defined by a plurality of cage bars.

7. The spiral conveyor system of claim 6, wherein the system includes a plurality of cage bar caps configured to cover the cage bars.

8. The spiral conveyor system of claim 7, wherein an entrance end of at least one cage bar cap of the plurality of cage bar caps is spaced from the entrance end of the drum such that the ring is provided between the entrance end of the drum and the entrance end of the at least one cage bar cap.

9. The spiral conveyor system of claim 6, wherein the system includes a cage bar cap including the rib; and
wherein the ring of the drum is a separate component attached to, and overlapping a portion of, the cage bar cap.

10. The spiral conveyor system of claim 6, wherein at least a part of the ribless portion extends between two or more of the drive elements.

11. The spiral conveyor system of claim 1, wherein the ring comprises more than 50% of the circumference of the drum.

12. The spiral conveyor system of claim 11, wherein the ring is substantially continuous.

13. The spiral conveyor system of claim 1, wherein the ring is a separate component from the cage bar cap.

14. The spiral conveyor system of claim 1, wherein the ring is a replaceable wear component.

15. The spiral conveyor system of claim 14, wherein the ring is made of plastic.

16. The spiral conveyor system of claim 1, wherein the ring abuts a terminus of the rib.

17. A spiral conveyor system comprising:
a drum associated with a motor, wherein the drum extends from a drum bottom to a drum top;
a conveyor belt traveling helically about the drum from an entrance end of the drum to an exit end of the drum;
a rib associated with the drum, wherein the rib extends radially from a surface of the drum;
the rib having at least one drive face configured to engage at least one belt surface;
wherein the drum includes a ring that extends around the drum proximate the entrance end of the drum, the ring having a substantially smooth surface extending circumferentially around the drum;
wherein the surface of the drum defines a first diameter of the drum; and
wherein the ring has a diameter that is larger than the first diameter of the drum.

18. The spiral conveyor system of claim 17, wherein the rib defines a second diameter of the drum; and
wherein the ring has a diameter that is approximately the same as the second diameter of the drum defined by the rib at a terminus of the rib proximate the entrance end of the drum.

19. The spiral conveyor system of claim 17, wherein the rib defines a second diameter of the drum; and
wherein the ring has a greater diameter than the second diameter of the drum defined by the rib at a terminus of the rib proximate the entrance end of the drum.

20. The spiral conveyor system of claim 17, further including a plurality of drive elements defined by a plurality of cage bars;
wherein the system includes a plurality of cage bar caps configured to cover the cage bars; and
wherein the ring is a separate component from the cage bar caps.

* * * * *